(12) United States Patent
Doi et al.

(10) Patent No.: US 8,051,694 B2
(45) Date of Patent: Nov. 8, 2011

(54) METHOD OF AND APPARATUS FOR MANUFACTURING SHAFT

(75) Inventors: Yoshihisa Doi, Utsunomiya (JP); Yoshimi Usui, Haga-gun (JP); Koichi Kawata, Utsunomiya (JP); Masahiko Seki, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 938 days.

(21) Appl. No.: 12/071,026

(22) Filed: Feb. 14, 2008

(65) Prior Publication Data
US 2008/0203616 A1 Aug. 28, 2008

(30) Foreign Application Priority Data

Feb. 22, 2007 (JP) ................................ 2007-042232
Feb. 22, 2007 (JP) ................................ 2007-042243

(51) Int. Cl.
*B21C 1/26* (2006.01)
*B21C 1/00* (2006.01)
(52) U.S. Cl. .......................................... 72/284; 72/274
(58) Field of Classification Search .................... 72/274, 72/276, 277, 278, 281, 282, 284, 285, 300, 72/308, 311, 343, 352; 264/293, 294, 296, 320, 322; 425/392

See application file for complete search history.

(56) References Cited

U.S. PATENT DOCUMENTS
2,109,312 A * 2/1938 Dimmick ........................ 72/282

FOREIGN PATENT DOCUMENTS
| CN | 1175766 A | 3/1998 |
| EP | 300149 A2 * | 1/1989 |
| JP | 10-036937 | 2/1998 |
| JP | 11-247835 | 9/1999 |

OTHER PUBLICATIONS

Chinese Office Action 200810080563.0 issued Jul. 10, 2009.

* cited by examiner

*Primary Examiner* — Teresa Ekiert
(74) *Attorney, Agent, or Firm* — Squire, Sanders & Dempsey (US) LLP

(57) ABSTRACT

A shaft manufacturing apparatus includes a first drawing die having a cylindrical first cavity defined therein which is open at both ends thereof and a second drawing die having a cylindrical second cavity defined therein which is open at one end thereof. The angle formed between a first tapered part of the first drawing die and the axis of the first cavity is greater than the angle formed between a second tapered part of the second drawing die and the axis of the second cavity.

9 Claims, 17 Drawing Sheets

10

10

10

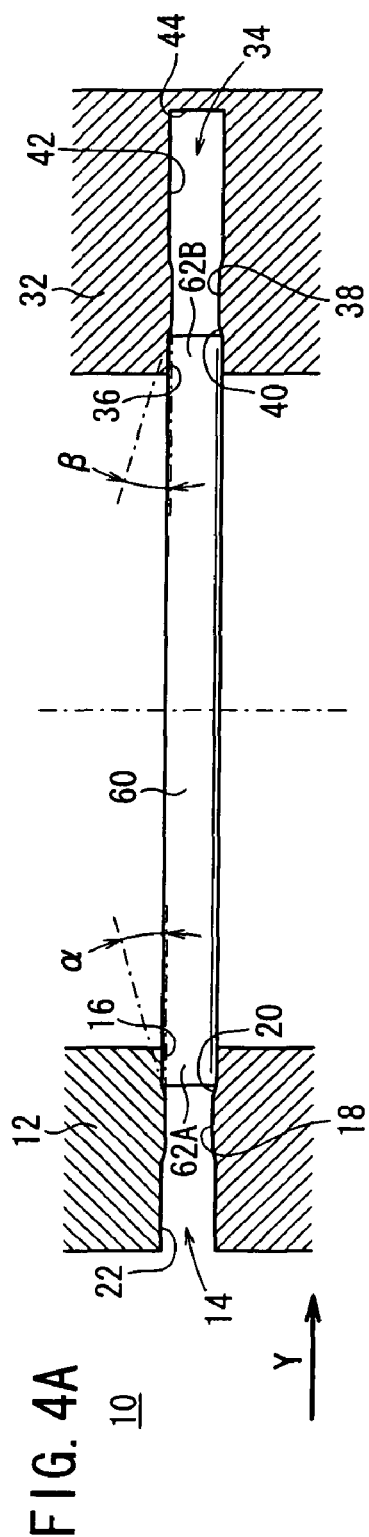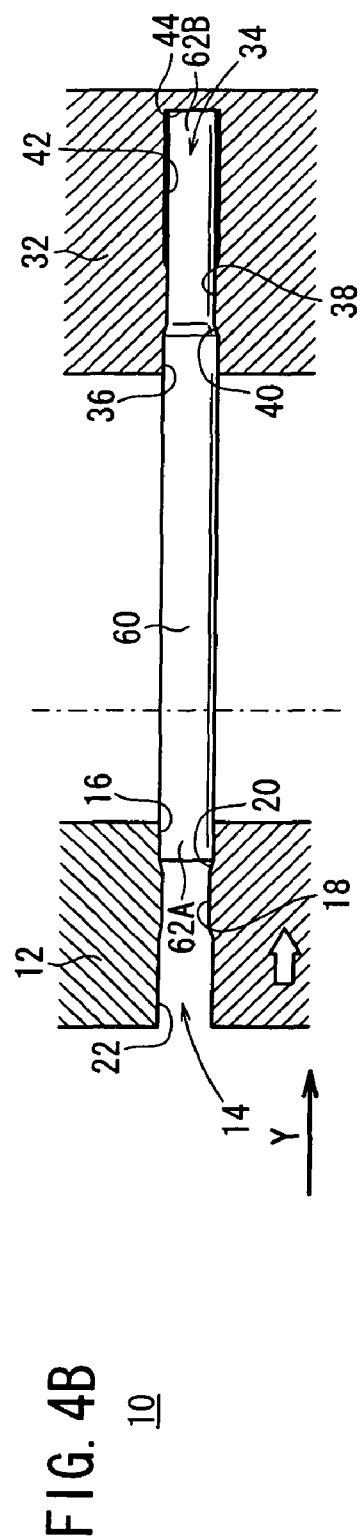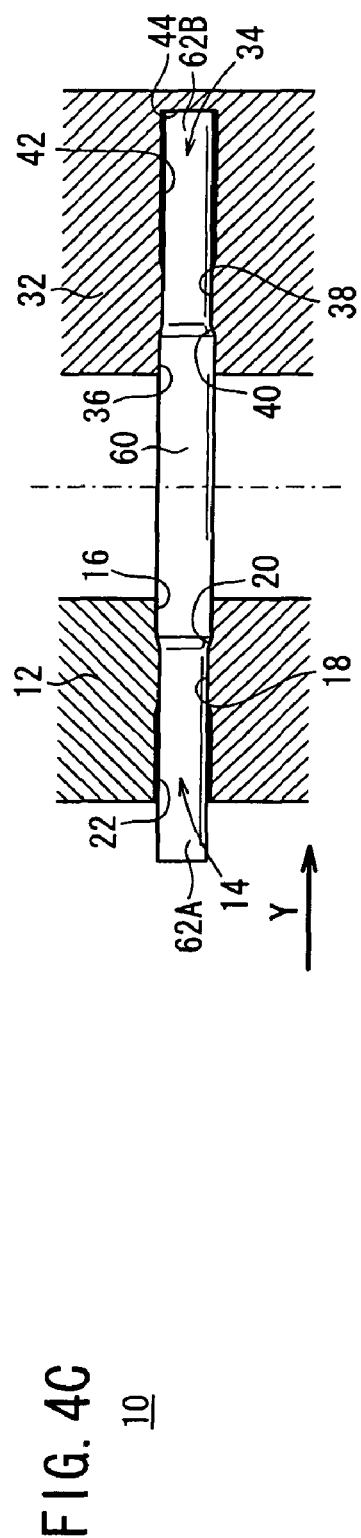

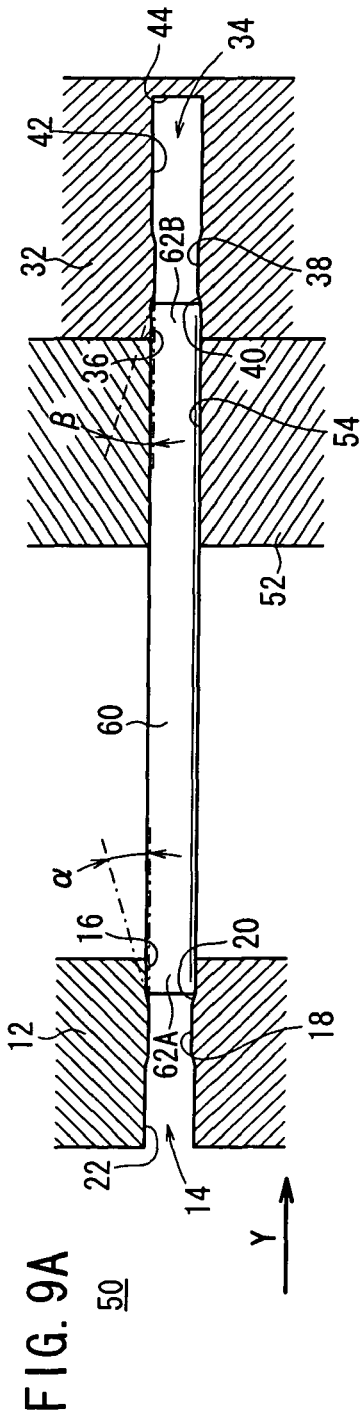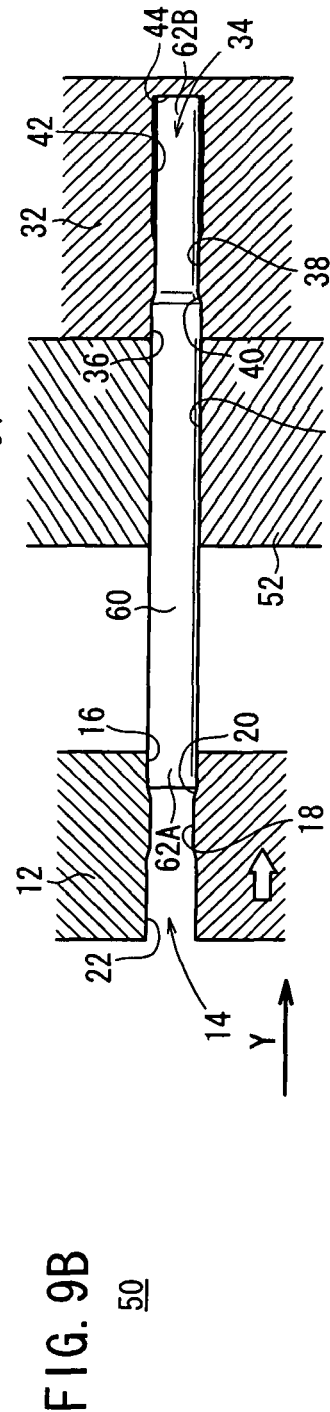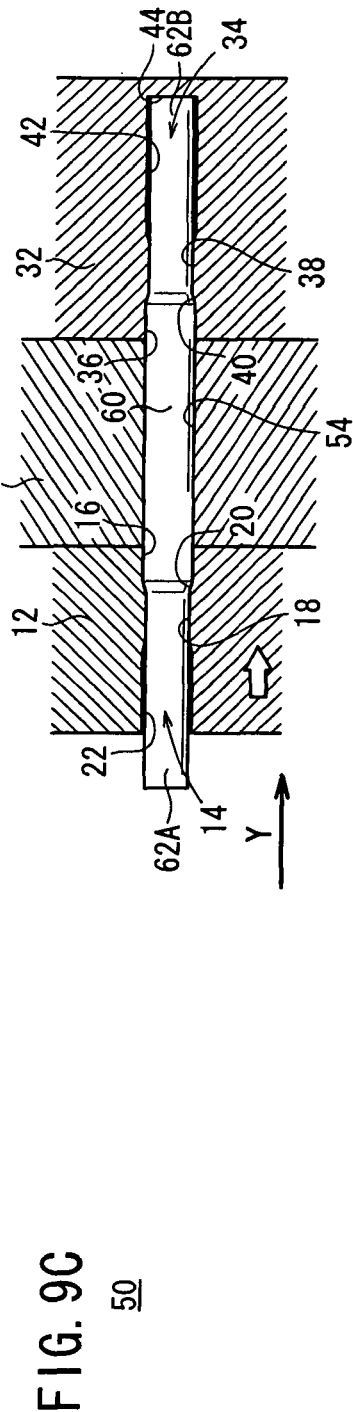

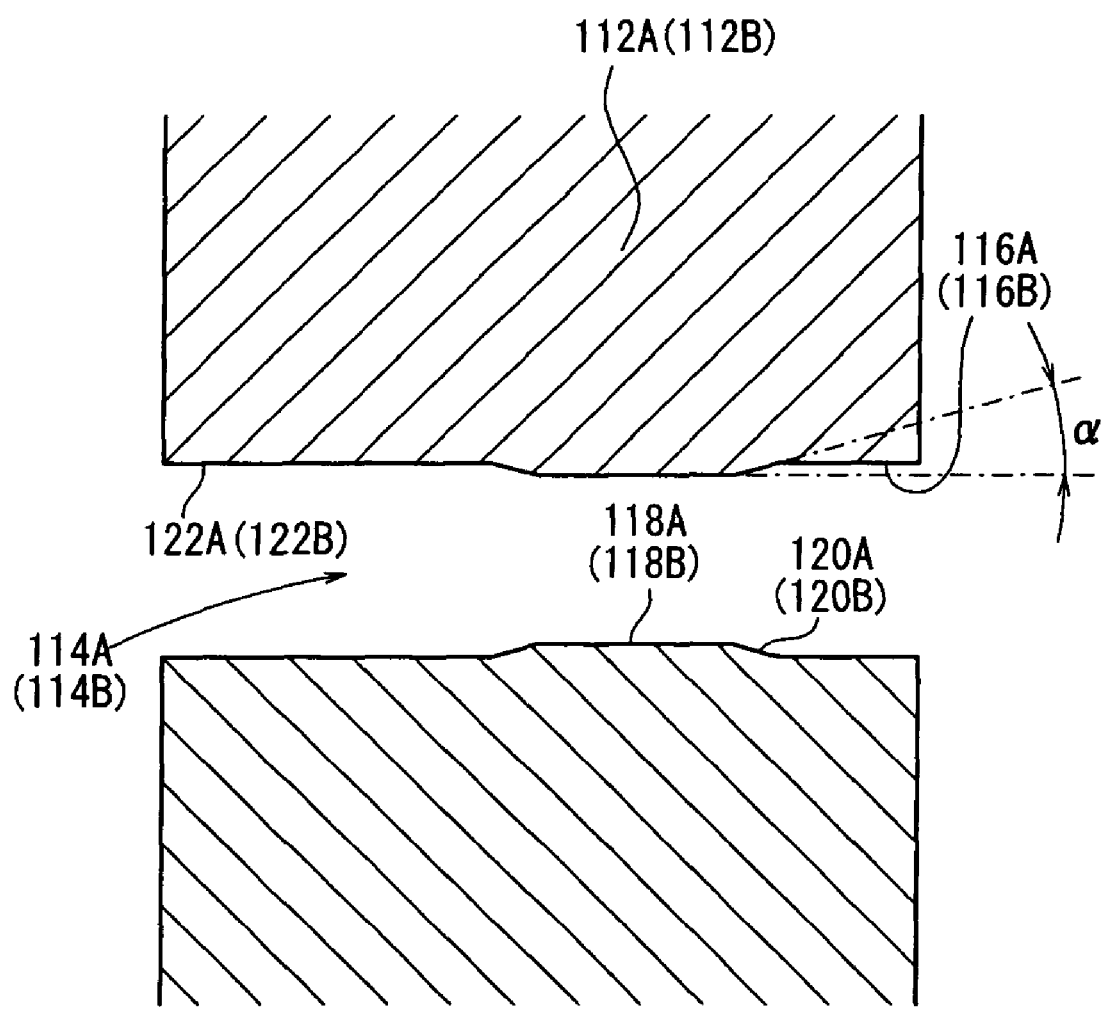

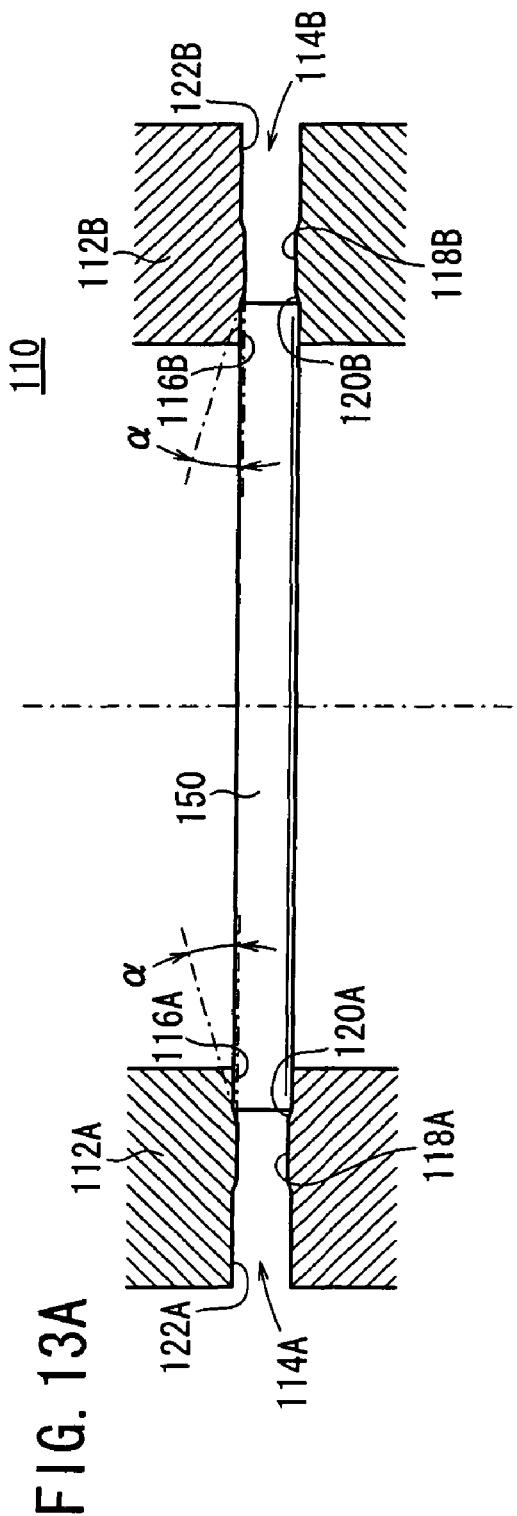
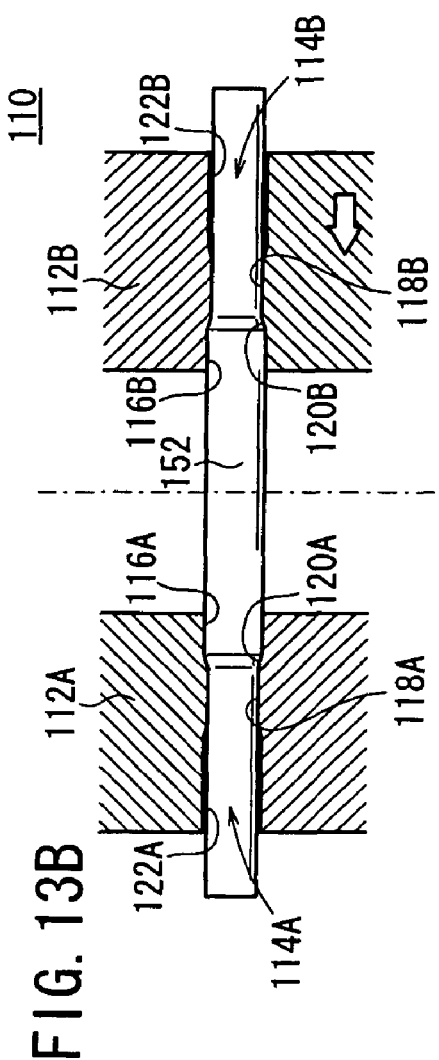
FIG. 13A
FIG. 13B

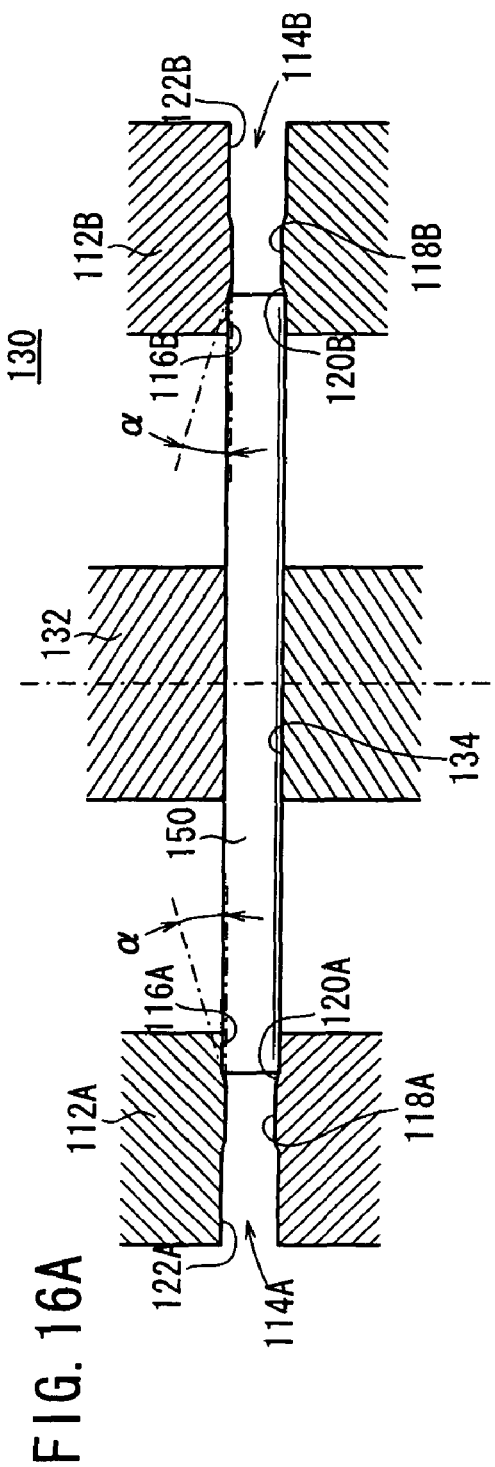
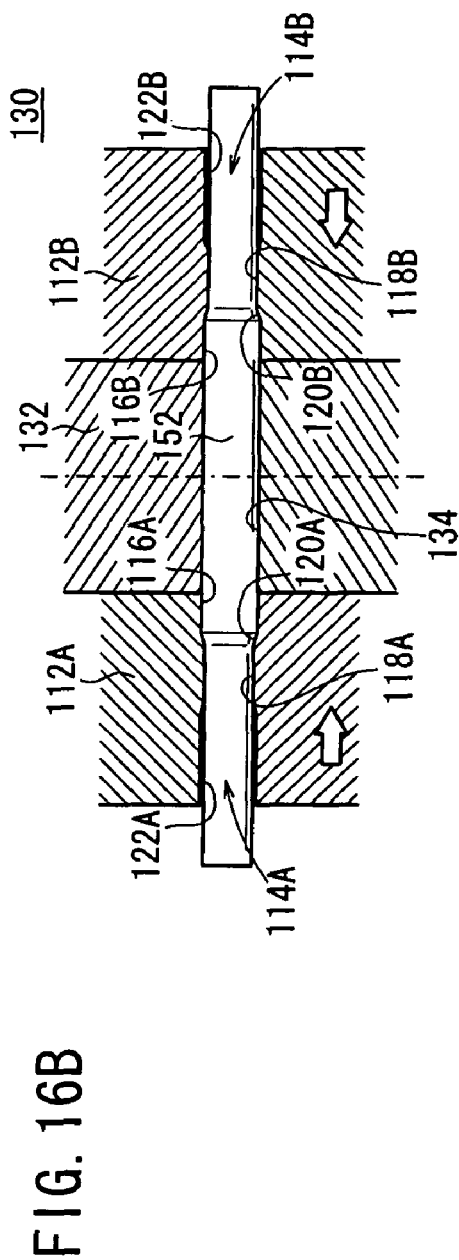
FIG. 16A
FIG. 16B

METHOD OF AND APPARATUS FOR MANUFACTURING SHAFT

BACKGROUND OF THE INVENTION

1. Field of the Invention

The present invention relates to a method of and an apparatus for manufacturing a shaft, and more particularly to a method of and an apparatus for manufacturing an elongate shaft that is suitable for transmitting power.

2. Description of the Related Art

Heretofore, drive shafts in automobiles serve as a component of the drive line for transmitting power from the engine, i.e., for transmitting rotary motion from the engine as rotary drive power to the drive wheels. There have been demands in the art for drive shafts that are lower in weight for better vehicle gas mileage and higher in rigidity for less vibration and noise.

One method of manufacturing a lightweight shaft is disclosed in Japanese Laid-Open Patent Publication No. 11-247835. According to the disclosed method, as shown in FIGS. 17A and 17B of the accompanying drawings, an end 202 of a hollow circular tube 200 is pressed into a cavity 206 defined in a die 204 so that it is squeezed into a smaller diameter (see FIG. 17A). Thereafter, a mandrel 208 is pushed into the opening in the end 202 to squeeze the end 202 between the inner circumferential surface of the cavity 206 and the outer circumferential surface of the mandrel 208 (see FIG. 17B). After the end 202 of the hollow circular tube 200 has been machined, the other end of the hollow circular tube 200 is similarly machined, thereby producing a shaft.

Japanese Laid-Open Patent Publication No. 10-036937 discloses a method of manufacturing a highly rigid shaft of carbon steel processed by high-frequency quenching.

The shaft disclosed in Japanese Laid-Open Patent Publication No. 11-247835 is a hollow shaft which is of a small wall thickness and low mechanical strength. Accordingly, it is difficult for the disclosed method to simultaneously machine the ends of the hollow circular tube 200. The disclosed method cannot be used to reduce the number of machining steps and shorten the manufacturing time by simultaneously machining the ends of the hollow circular tube 200.

The shaft disclosed in Japanese Laid-Open Patent Publication No. 10-036937 has a high level of high surface hardness. The disclosed method finds it difficult to simultaneously machine both ends of a cylindrical solid rod on a lathe, and fails to reduce the number of machining steps and shorten the manufacturing time in manufacturing a shaft.

SUMMARY OF THE INVENTION

It is an object of the present invention to provide a method of and an apparatus for manufacturing a shaft through a simple process by simultaneously drawing both ends of a cylindrical solid rod, so that a high-quality shaft can be produced in a reduced number of machining steps and a shortened manufacturing time.

According to an aspect of the present invention, there is provided a method of manufacturing a shaft with a first drawing die having a cylindrical first cavity defined therein which is open at both ends thereof and a second drawing die having a cylindrical second cavity defined therein which is open at one end thereof, wherein the first cavity has first and second openings and a first forming land disposed in the first cavity, the diameters of the first and second openings being greater than the diameter of the first forming land, and the second cavity has a third opening, an inner space, and a second forming land disposed in the second cavity, the diameters of the third opening and the inner space being greater than the diameter of the second forming land, the first cavity further including a first tapered part extending from the first opening to the first forming land, the second cavity further including a second tapered part extending from the third opening to the second forming land, and wherein the angle formed between the first tapered part and the axis of the first cavity is greater than the angle formed between the second tapered part and the axis of the second cavity, the method comprising the steps of (a) inserting opposite end portions of a cylindrical solid rod respectively into the first opening and the third opening, (b) displacing at least one of the first drawing die and the second drawing die in a direction to cause the first opening and third opening to move toward each other, until the end portion of the cylindrical solid rod which is inserted in the third opening reaches a closed end of the inner space of the second cavity, thereby causing the second tapered part and the second forming land to draw the end portion of the cylindrical solid rod, and (c) displacing at least one of the first drawing die and the second drawing die in the direction to cause the first opening and third opening to move toward each other, thereby causing the first tapered part and the first forming land to draw the other end portion of the cylindrical solid rod.

According to the above method, the opposite end portions of the cylindrical solid rod can be drawn in a simple process to manufacture a shaft in a reduced number of machining steps and a shortened manufacturing time.

According to another aspect of the present invention, there is provided an apparatus for manufacturing a shaft, comprising a first drawing die having a cylindrical first cavity defined therein which is open at both ends thereof, and a second drawing die having a cylindrical second cavity defined therein which is open at one end thereof, wherein the first cavity has first and second openings and a first forming land disposed in the first cavity, the diameters of the first and second openings being greater than the diameter of the first forming land, the second cavity has a third opening, an inner space, and a second forming land disposed in the second cavity, the diameters of the third opening and the inner space being greater than the diameter of the second forming land, the first cavity further including a first tapered part extending from the first opening to the first forming land, the second cavity further including a second tapered part extending from the third opening to the second forming land, wherein the angle formed between the first tapered part and the axis of the first cavity is greater than the angle formed between the second tapered part and the axis of the second cavity, and wherein after opposite end portions of a cylindrical solid rod have been inserted respectively into the first opening and the third opening, at least one of the first drawing die and the second drawing die is displaced in a direction to cause the first opening and third opening to move toward each other, until the end portion of the cylindrical solid rod which is inserted in the third opening reaches a closed end of the inner space of the second cavity, thereby causing the second tapered part and the second forming land to draw the end portion of the cylindrical solid rod, and thereafter at least one of the first drawing die and the second drawing die is displaced in the direction to cause the first opening and third opening to move toward each other, thereby causing the first tapered part and the first forming land to draw the other end portion of the cylindrical solid rod.

Either one of the first drawing die and the second drawing die may be fixed in position.

The apparatus may further comprise a guide die disposed between the first drawing die and the second drawing die, the guide die having a through hole defined therein for inserting the cylindrical solid rod therethrough. When the opposite end portions of the cylindrical solid rod are simultaneously drawn, the cylindrical solid rod is prevented from buckling or being swaged. The apparatus is thus capable of producing a high-quality shaft.

According to still another aspect of the present invention, there is provided a method of manufacturing a shaft with a third drawing die and a fourth drawing die each having a cylindrical cavity defined therein which is open at both ends thereof, wherein the cylindrical cavity in each of the third drawing die and the fourth drawing die has a fourth opening, a fifth opening, and a forming land disposed in the cavity, the diameters of the fourth opening and the fifth opening being greater than the diameter of the forming land, the cylindrical cavity in each of the third drawing die and the fourth drawing die further including a tapered part extending from the fourth opening to the forming land, and wherein the angle formed between the tapered part of the cylindrical cavity in the third drawing die and the axis of the cylindrical cavity in the third drawing die is equal to the angle formed between the tapered part of the cylindrical cavity in the fourth drawing die and the axis of the cylindrical cavity in the fourth drawing die, the method comprising the steps of (a) inserting opposite end portions of a cylindrical solid rod respectively into the fourth openings, and (b) displacing at least one of the third drawing die and the fourth drawing die in a direction to cause the fourth openings to move toward each other, thereby causing the tapered parts and the forming lands to draw the end portions of the cylindrical solid rod which are inserted respectively in the fourth openings.

According to the above method, the opposite end portions of the cylindrical solid rod are simultaneously drawn to manufacture a shaft in a reduced number of machining steps and a shortened manufacturing time.

According to yet still another aspect of the present invention, there is provided an apparatus for manufacturing a shaft, comprising a third drawing die and a fourth drawing die each having a cylindrical cavity defined therein which is open at both ends thereof, wherein the cylindrical cavity in each of the third drawing die and the fourth drawing die has a fourth opening, a fifth opening, and a forming land disposed in the cavity, the diameters of the fourth opening and the fifth opening being greater than the diameter of the forming land, the cylindrical cavity in each of the third drawing die and the fourth drawing die further including a tapered part extending from the fourth opening to the forming land, wherein the angle formed between the tapered part of the cylindrical cavity in the third drawing die and the axis of the cylindrical cavity in the third drawing die is equal to the angle formed between the tapered part of the cylindrical cavity in the fourth drawing die and the axis of the cylindrical cavity in the fourth drawing die, and wherein after opposite end portions of a cylindrical solid rod have been inserted respectively into the fourth openings, at least one of the third drawing die and the fourth drawing die is displaced in a direction to cause the fourth openings to move toward each other, thereby causing the tapered parts and the forming lands to draw the end portions of the cylindrical solid rod.

Either one of the third drawing die and the fourth drawing die may be fixed in position.

The apparatus may further comprise a guide die disposed between the third drawing die and the fourth drawing die, the guide die having a through hole defined therein for inserting the cylindrical solid rod therethrough. When the opposite end portions of the cylindrical solid rod are simultaneously drawn, the cylindrical solid rod is prevented from buckling or being swaged. The apparatus is thus capable of producing a high-quality shaft.

According to the present invention, since the opposite end portions of the cylindrical solid rod can be drawn in a simple process, a shaft can be manufactured in a reduced number of machining steps and a shortened manufacturing time. The guide die disposed between the first drawing die and the second drawing die or between the third drawing die and the fourth drawing die, is effective to prevent the cylindrical solid rod from buckling or being swaged when the opposite end portions of the cylindrical solid rod are simultaneously drawn. Accordingly, a high-quality shaft can be produced by drawing the opposite end portions of the cylindrical solid rod.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4A through 4C are cross-sectional views showing successive steps of a shaft manufacturing process in which the cylindrical solid rod is inserted in the shaft manufacturing apparatus according to the first embodiment, with the second drawing die being fixed in position;

FIGS. 9A through 9C are cross-sectional views taken along line IXA-IXA of FIG. 8, showing successive steps of a shaft manufacturing process in which the cylindrical solid rod is inserted in the shaft manufacturing apparatus according to the second embodiment, with the second drawing die being fixed in position;

FIG. 11 is a fragmentary cross-sectional view of a drawing die before a cylindrical solid rod is inserted into the drawing die;

FIGS. 13A and 13B are cross-sectional views showing successive steps of a shaft manufacturing process in which the cylindrical solid rod is inserted in the shaft manufacturing apparatus according to the third embodiment;

FIGS. 16A and 16B are cross-sectional views taken along line XVIA-XVIA of FIG. 14, showing successive steps of a shaft manufacturing process in which the cylindrical solid rod is inserted in the shaft manufacturing apparatus according to the fourth embodiment.

DESCRIPTION OF THE PREFERRED EMBODIMENTS

Figure 1:
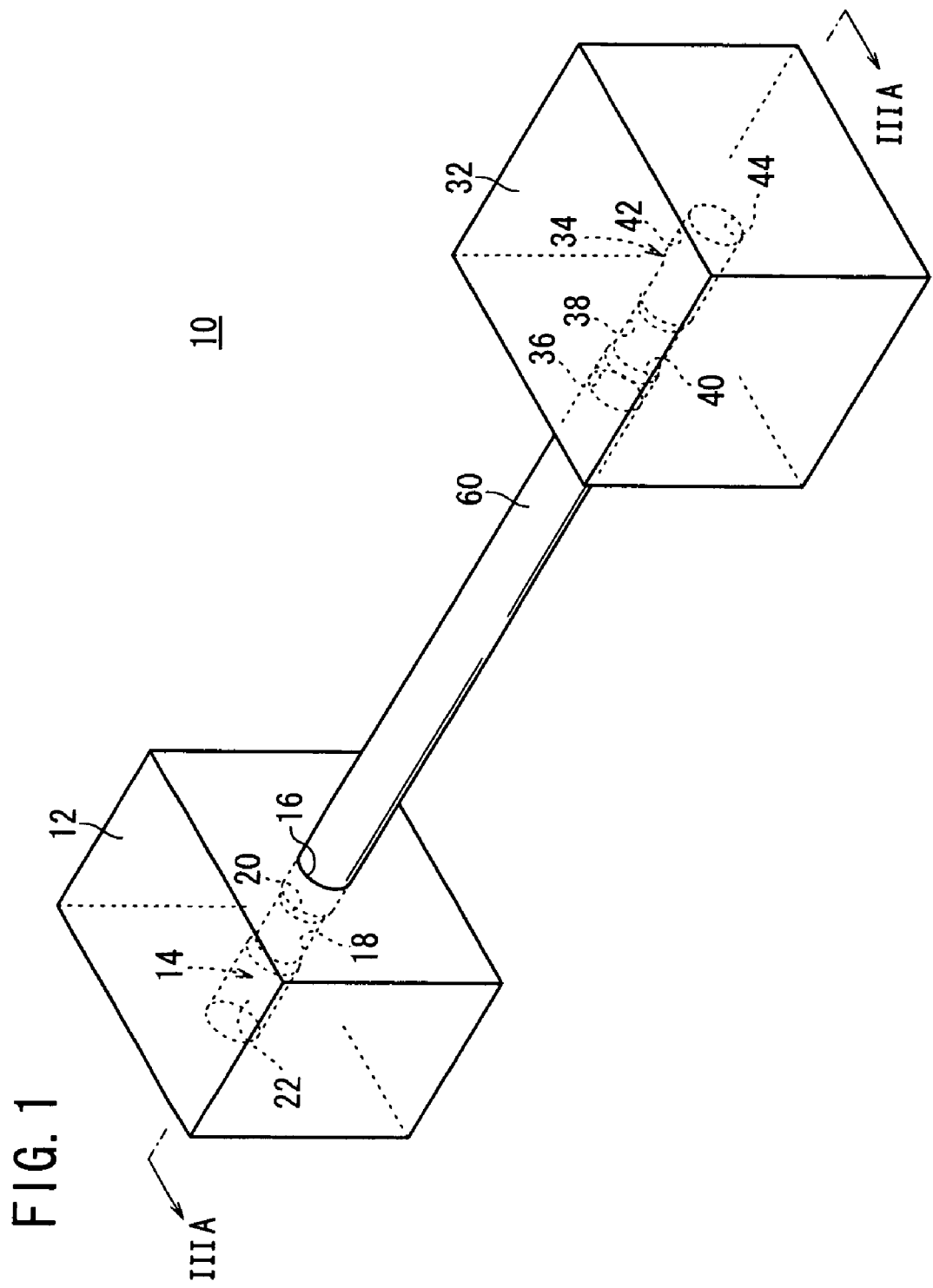
FIG. 1 is a perspective view of a shaft manufacturing apparatus according to a first embodiment of the present invention.

Preferred embodiments of the present invention will be described below with reference to the drawings. FIG. 1 is a perspective view of a shaft manufacturing apparatus according to a first embodiment of the present invention.

Figure 2A:
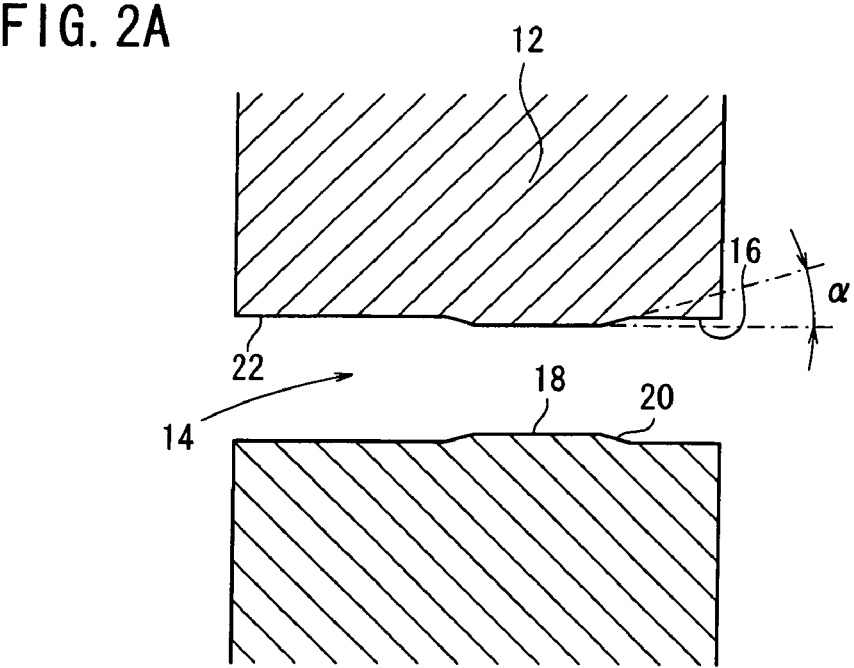
FIGS. 2A and 2B are fragmentary cross-sectional views of first and second drawing dies before a cylindrical solid rod is inserted into the drawing dies.

As shown in FIG. 1, the shaft manufacturing apparatus 10 comprises a columnar first drawing die 12 and a columnar second drawing die 32. The first drawing die 12 has a cylindrical first cavity 14 defined therein which is open at both ends thereof. A cylindrical solid rod 60 as a blank to be drawn has an end portion inserted into the first cavity 14 through a first opening 16 in one of the ends thereof. The first cavity 14 is defined by a circumferential wall surface having a first forming land 18 for drawing the end portion of the cylindrical solid rod 60, a first tapered part 20 extending from the first opening 16 to the first forming land 18, and a second opening 22 for accommodating the end portion of the cylindrical solid rod 60 therein after the end portion of the cylindrical solid rod 60 has been drawn. The diameter of the first opening 16 is substantially equal to the diameter of the cylindrical solid rod 60, and is greater than the diameter of the first forming land 18. The first tapered part 20 is inclined a predetermined angle α to the axis of the first cavity 14 (see FIG. 2A). The diameter of the second opening 22 is greater than the diameter of the first forming land 18.

Figure 2B:
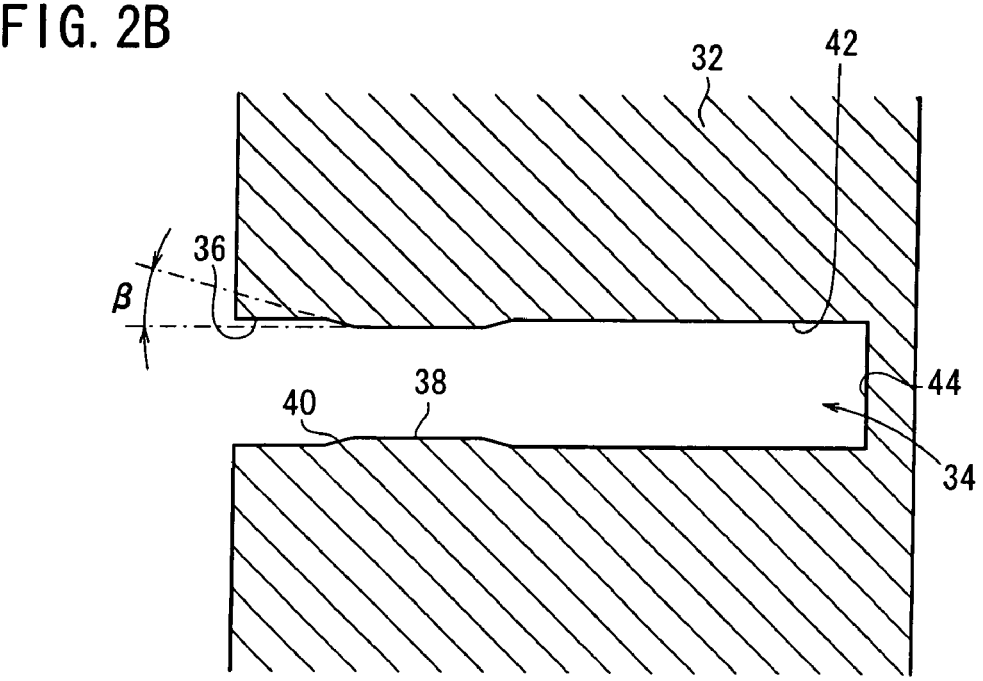

The second drawing die 32 has a cylindrical second cavity 34 defined therein which is open at one end and closed at the other end. The cylindrical solid rod 60 has another end portion inserted into the second cavity 34 through a third opening 36 in the open end thereof. The second cavity 34 is defined by a circumferential wall surface having a second forming land 38 for drawing the cylindrical solid rod 60, a second tapered part 40 extending from the third opening 36 to the second forming land 38, and an inner space 42 for accommodating the other end portion of the cylindrical solid rod 60 therein after the other end portion of the cylindrical solid rod 60 has been drawn. The diameter of the third opening 36 is substantially equal to the diameter of the cylindrical solid rod 60, and is greater than the diameter of the second forming land 38. The second tapered part 40 is inclined a predetermined angle β to the axis of the second cavity 34 (see FIG. 2B). The diameter of the inner space 42 is greater than the diameter of the second forming land 38.

The angle α formed between the first tapered part 20 and the axis of the first cavity 14 is greater than the angle β formed between the second tapered part 40 and the axis of the second cavity 34. Since the angle α is greater than the angle β, when the end portions of the cylindrical solid rod 60 is drawn, the end portion of the cylindrical solid rod 60 which is inserted in the second drawing die 32 starts being drawn earlier than the end portion of the cylindrical solid rod 60 which is inserted in the first drawing die 12. Though the angles α, β are not limited to any particular values, the angle α should preferably be in the range from 15 degrees to 25 degrees, and the angle β should preferably be in the range from 10 degrees to 20 degrees. Furthermore, the angle α should be greater than the angle β preferably by a range from 3 degrees to 9 degrees, or more preferably by a range from 5 degrees to 7 degrees.

A method of manufacturing a shaft according to the first embodiment, which is carried out by the shaft manufacturing apparatus 10 according to the first embodiment, will be described below with reference to FIGS. 3A through 3D.

Figure 3A:
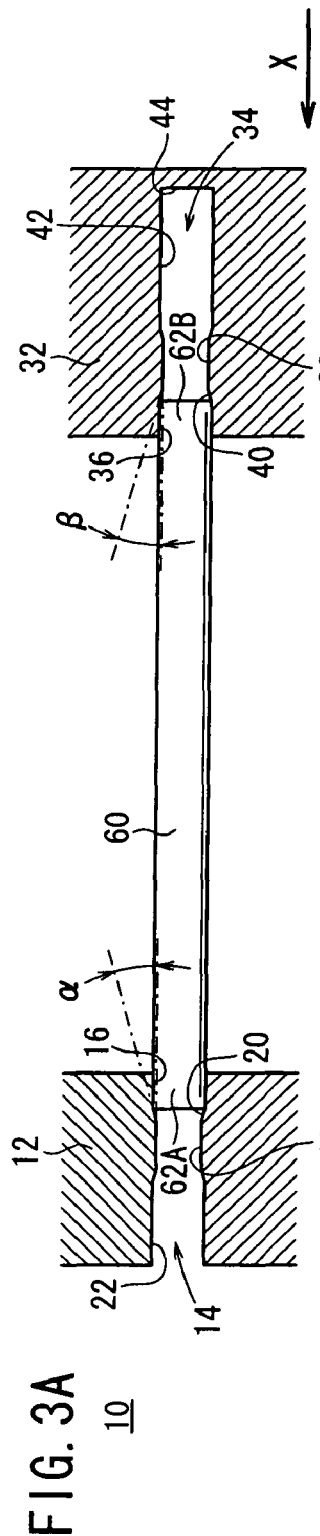
FIGS. 3A through 3C are cross-sectional views taken along line IIIA-IIIA of FIG. 1, showing successive steps of a shaft manufacturing process in which the cylindrical solid rod is inserted in the shaft manufacturing apparatus according to the first embodiment.
Figure 3B:
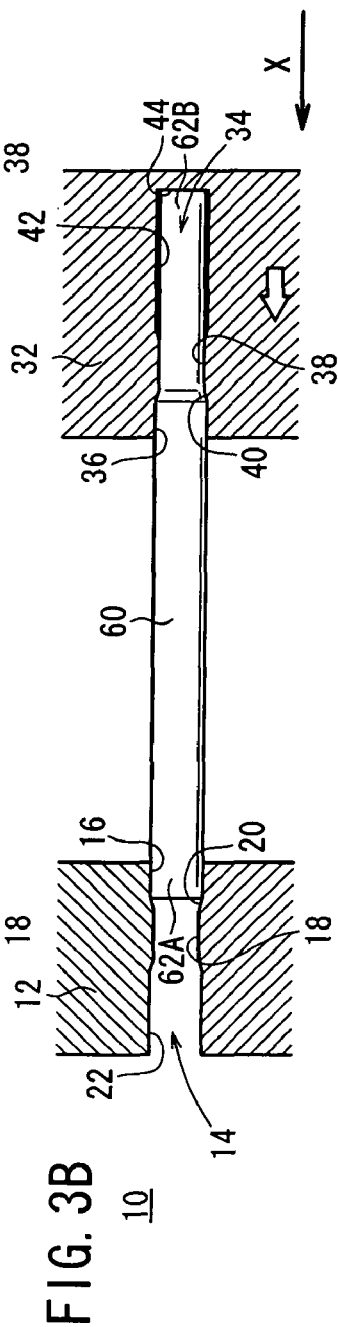

The first drawing die 12 is fixed in position, and the second drawing die 32 is disposed in spaced-apart relation to the first drawing die 12 such that the third opening 36 confronts the first opening 16. The opposite end portions of the cylindrical solid rod 60 are inserted respectively into the first opening 16 and the third opening 36. Then, as shown in FIG. 3A, the second drawing die 32 is displaced toward the first drawing die 12 in the direction indicated by the arrow X. Since the angle α of the first tapered part 20 is greater than the angle β of the second tapered part 40 as described above, when the end portion, denoted by 62A, of the cylindrical solid rod 60 which is inserted in the first opening 16 abuts against the first tapered part 20 and the end portion, denoted by 62B, of the cylindrical solid rod 60 which is inserted in the third opening 36 abuts against the second tapered part 40, a frictional force generated by the contact between the end portion 62A and the first tapered part 20 is greater than a frictional force generated by the contact between the end portion 62B and the second tapered part 40. Therefore, when the second drawing die 32 is displaced in the direction indicated by the arrow X, the end portion 62A is not essentially drawn, and the end portion 62B is drawn by the second tapered part 40 and the second forming land 38. The end portion 62B is continuously drawn until it abuts against a closed end 44 of the inner space 42 (see FIG. 3B).

Figure 3C:
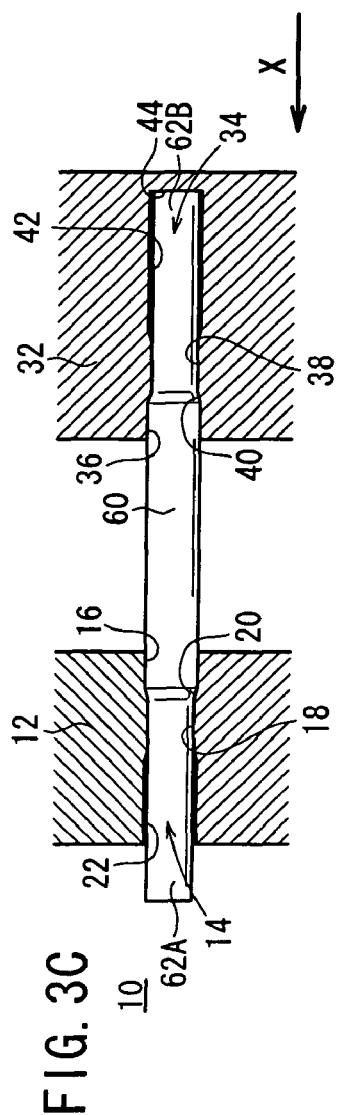
Figure 3D:
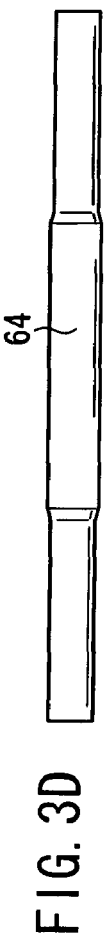
FIG. 3D is a side elevational view of a shaft manufactured by the shaft manufacturing apparatus according to the first embodiment.

When the end portion 62B abuts against the closed end 44, since the force applied to displace the second drawing die 32 in the direction indicated by the arrow X and also to push the end portion 62B engaging the closed end 44 is greater than the frictional force generated by the contact between the end portion 62A and the first tapered part 20, the end portion 62A of the cylindrical solid rod 60 is displaced in the direction indicated by the arrow X, and is drawn by the first tapered part 20 and the first forming land 18, as shown in FIG. 3C.

After the end portion 62A has been drawn over a desired range, the second drawing die 32 is displaced away from the first drawing die 12, and removed from the cylindrical solid rod 60. Then, the cylindrical solid rod 60 is removed from the first drawing die 12. The cylindrical solid rod 60 thus drawn is now available as a desired shaft 64 (see FIG. 3D) with a central portion thereof being greater in diameter than opposite end portions thereof.

According to the above shaft manufacturing method, the first drawing die 12 is fixed in position and the second drawing die 32 is displaced toward the first drawing die 12. However, the second drawing die 32 may be fixed in position and the first drawing die 12 may be displaced toward the second drawing die 32 to draw the opposite end portions of the cylindrical solid rod 60.

Such an alternative manufacturing method will be described below with reference to FIGS. 4A through 4C.

The second drawing die 32 is fixed in position, and the first drawing die 12 is disposed in spaced-apart relation to the second drawing die 32 such that the first opening 16 confronts the third opening 36. The opposite end portions of the cylindrical solid rod 60 are inserted respectively into the first opening 16 and the third opening 36. Then, as shown in FIG. 4A, the first drawing die 12 is displaced toward the second drawing die 32 in the direction indicated by the arrow Y. Since the angle α of the first tapered part 20 is greater than the angle β of the second tapered part 40 as described above, when the first drawing die 12 is displaced in the direction indicated by the arrow Y, the end portion 62A is not essentially drawn, and the end portion 62B is drawn by the second tapered part 40 and the second forming land 38. The end portion 62B is continuously drawn until it abuts against the closed end 44 of the inner space 42 (see FIG. 4B).

After the end portion 62B has abutted against the closed end 44, the first drawing die 12 is further displaced in the direction indicated by the arrow Y to cause the first tapered part 20 and the first forming land 18 to draw the end portion 62A (see FIG. 4C).

After the end portion 62A has been drawn over a desired range, the first drawing die 12 is displaced away from the second drawing die 32, and removed from the cylindrical solid rod 60. Then, the cylindrical solid rod 60 is removed from the second drawing die 32. The cylindrical solid rod 60 thus drawn is now available as the desired shaft 64 with the central portion thereof being greater in diameter than the opposite end portions.

As described above, the method of and the apparatus for manufacturing the shaft according to the first embodiment employ the first drawing die 12 with the cylindrical first cavity 14 defined therein which is open at both ends thereof, and the second drawing die 32 with the cylindrical second cavity 34 which is open at one end and closed at the other end. The diameters of the first and second openings 16, 22 of the first cavity 14 are greater than the diameter of the first forming land 18, and the diameters of the third opening 36 and the inner space 42 of the second cavity 34 are greater than the diameter of the second forming land 38. The first tapered part 20 extends from the first opening 16 to the first forming land 18, and the second tapered part 40 extends from the third opening 36 to the second forming land 38. The angle α formed between the first tapered part 20 and the axis of the first cavity 14 is greater than the angle β formed between the second tapered part 40 and the axis of the second cavity 34. The shaft manufacturing apparatus 10 thus constructed operates to draw the cylindrical solid rod 60 as follows: The opposite end portions of the cylindrical solid rod 60 are inserted respectively into the first opening 16 and the third opening 36, and at least one of the first and second drawing dies 12, 32 is displaced in a direction to move the first opening 16 and the third opening 36 toward each other until the end portion 62B of the cylindrical solid rod 60 which is inserted in the third opening 36 abuts against the closed end 44 of the inner space 42 of the second cavity 34. The end portion 62B is now drawn by the second tapered part 40 and the second forming land 38. Then, at least one of the first and second drawing dies 12, 32 is displaced in a direction to move the first opening 16 and the third opening 36 toward each other to cause the first tapered part 20 and the first forming land 18 to draw the end portion 62A of the cylindrical solid rod 60. In this manner, the desired shaft 64 is manufactured.

Figure 5:
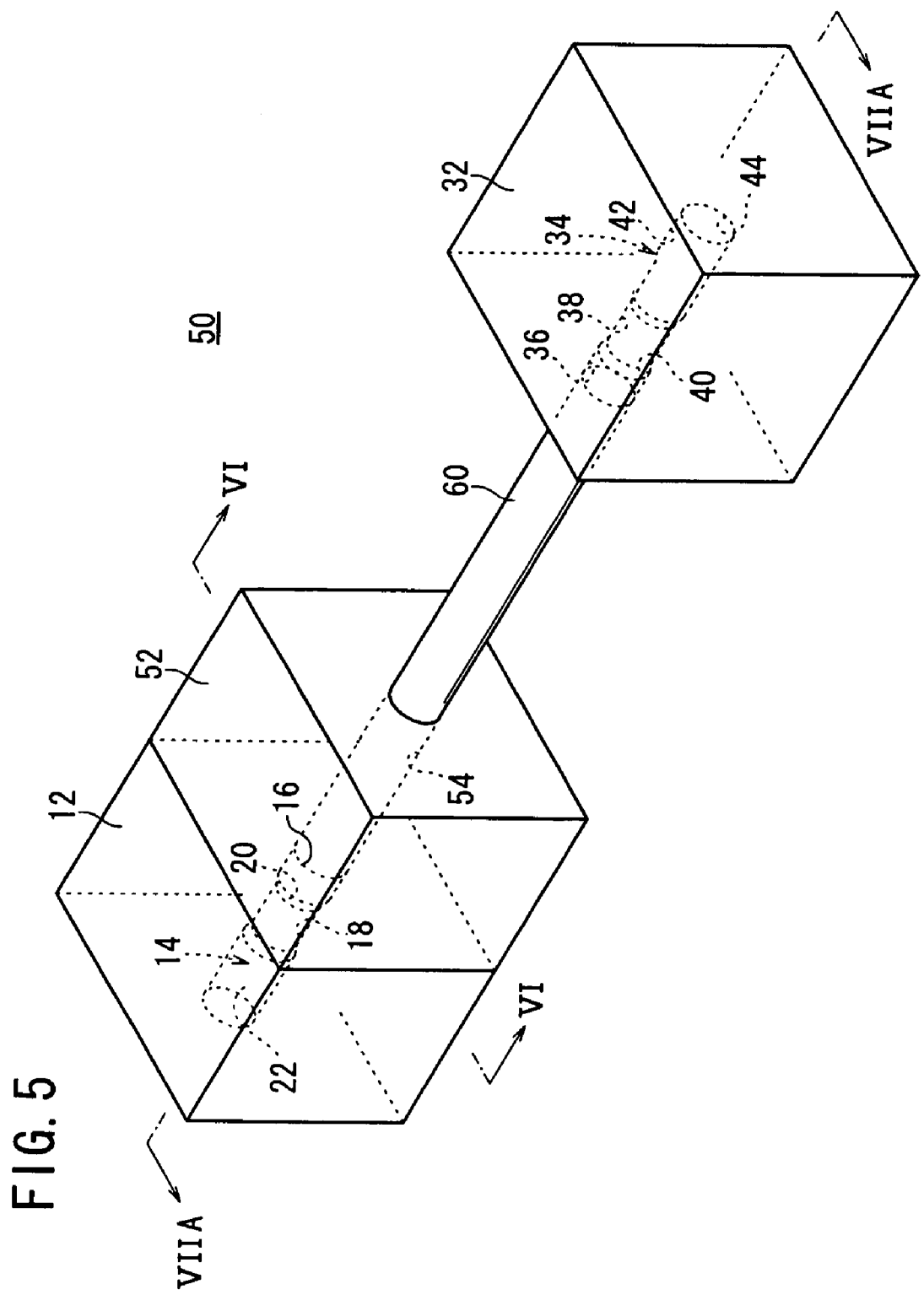
FIG. 5 is a perspective view of a shaft manufacturing apparatus according to a second embodiment of the present invention.

FIG. 5 is a perspective view of a shaft manufacturing apparatus 50 according to a second embodiment of the present invention. Those parts shown in FIG. 5 which are identical to those of the shaft manufacturing apparatus 10 according to the first embodiment are denoted by identical reference characters, and will not be described in detail below. The shaft manufacturing apparatus 50 is similar to the shaft manufacturing apparatus 10 according to the first embodiment except that it additionally includes a columnar guide die 52 interposed between the first drawing die 12 and the second drawing die 32.

Figure 6:
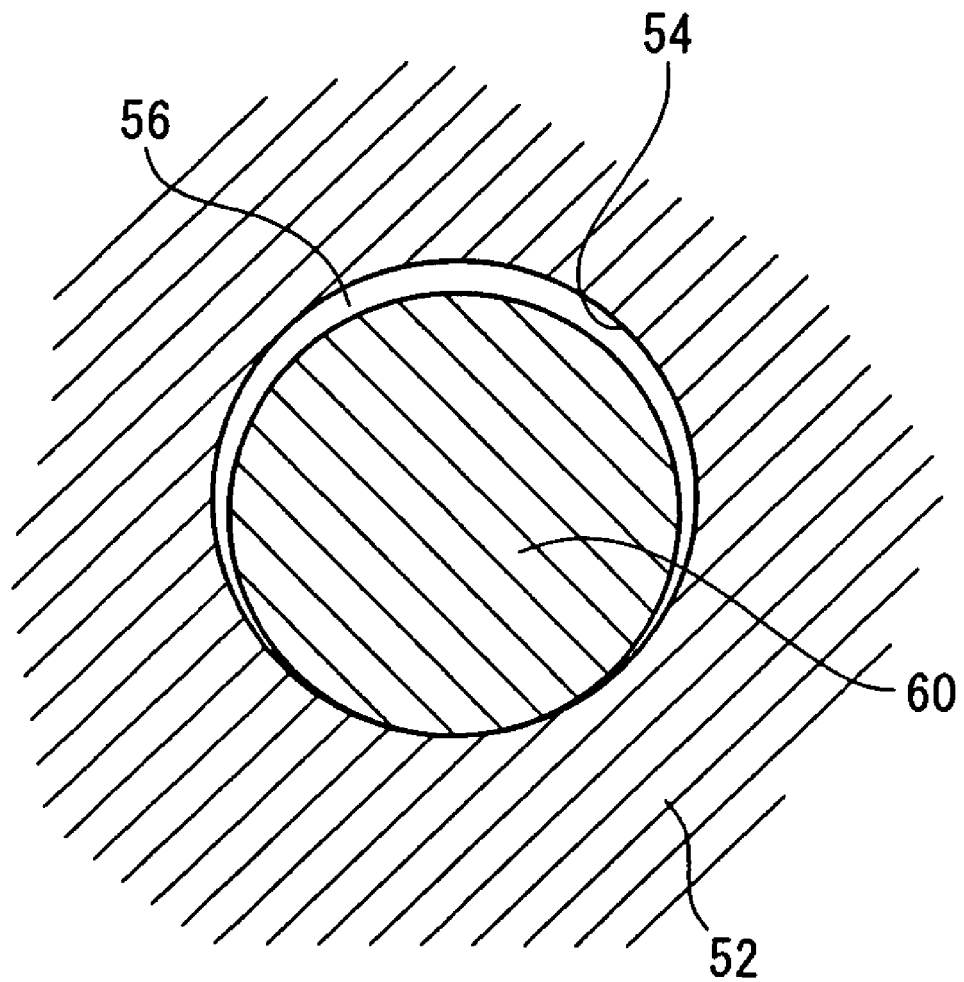
FIG. 6 is a cross-sectional view taken along line VI-VI of FIG. 5.

The columnar guide die 52 has a through hole 54 defined therein for inserting the cylindrical solid rod 60 therein and guiding the cylindrical solid rod 60 therethrough. As shown in FIG. 6, the diameter of the through hole 54 is greater than the diameter of the cylindrical solid rod 60, providing a given clearance 56 between the cylindrical solid rod 60 and the inner surface defining the through hole 54 when the cylindrical solid rod 60 is inserted in the through hole 54. The clearance 56 allows the cylindrical solid rod 60 to be easily inserted into the through hole 54.

A method of manufacturing a shaft according to the second embodiment, which is carried out by the shaft manufacturing apparatus 50 according to the second embodiment, will be described below with reference to FIGS. 7A through 7C.

The cylindrical solid rod 60 is inserted through the through hole 54 in the guide die 52, and the first drawing die 12 is fixedly disposed so as to hold the first opening 16 in the first drawing die 12 in positional alignment with the through hole 54 in the guide die 52 (see FIG. 5). Then, with an end of the guide die 52 being held against the first drawing die 12, the end portion 62A of the cylindrical solid rod 60 which is inserted through the through hole 54 is inserted into the first opening 16. The end portion 62B of the cylindrical solid rod 60 is inserted into the third opening 36. Then, as shown in FIG. 7A, the second drawing die 32 is displaced toward the first drawing die 12 in the direction indicated by the arrow X. Since the angle α of the first tapered part 20 is greater than the angle β of the second tapered part 40 as described above, when the second drawing die 32 is displaced in the direction indicated by the arrow X, the end portion 62A is not essentially drawn, and the end portion 62B is displaced in the direction indicated by the arrow X and drawn by the second tapered part 40 and the second forming land 38. The end portion 62B is continuously drawn until it abuts against the closed end 44 of the inner space 42 (see FIG. 7B).

Figure 7:
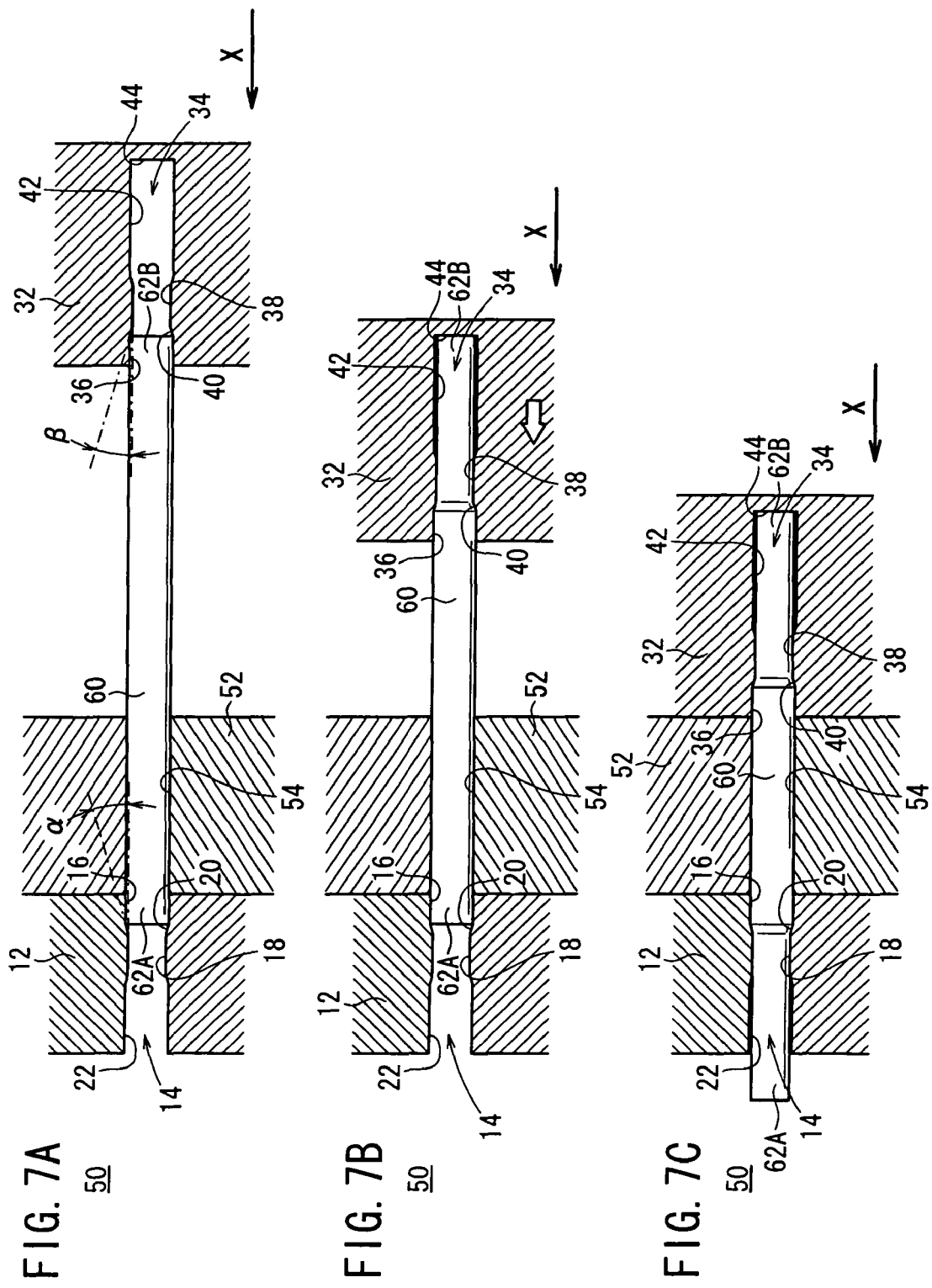
FIGS. 7A through 7C are cross-sectional views taken along line VIIA-VIIA of FIG. 5, showing successive steps of a shaft manufacturing process in which the cylindrical solid rod is inserted in the shaft manufacturing apparatus according to the second embodiment.

After the end portion 62B has abutted against the closed end 44, the second drawing die 32 is further displaced in the direction indicated by the arrow X to cause the first tapered part 20 and the first forming land 18 to draw the end portion 62A (see FIG. 7C).

After the end portion 62A has been drawn over a desired range, the second drawing die 32 is displaced away from the first drawing die 12, and removed from the cylindrical solid rod 60. Then, the cylindrical solid rod 60 is removed from the first drawing die 12 and the guide die 52. The cylindrical solid rod 60 thus drawn is now available as the desired shaft 64 with the central portion thereof being greater in diameter than the opposite end portions.

According to the above shaft manufacturing method, the first drawing die 12 is fixed in position and the second drawing die 32 is displaced toward the first drawing die 12. However, the second drawing die 32 may be fixed in position and the first drawing die 12 may be displaced toward the second drawing die 32 to draw the opposite end portions of the cylindrical solid rod 60.

Such an alternative manufacturing method will be described below with reference to FIGS. 8 and 9A through 9C.

Figure 8:
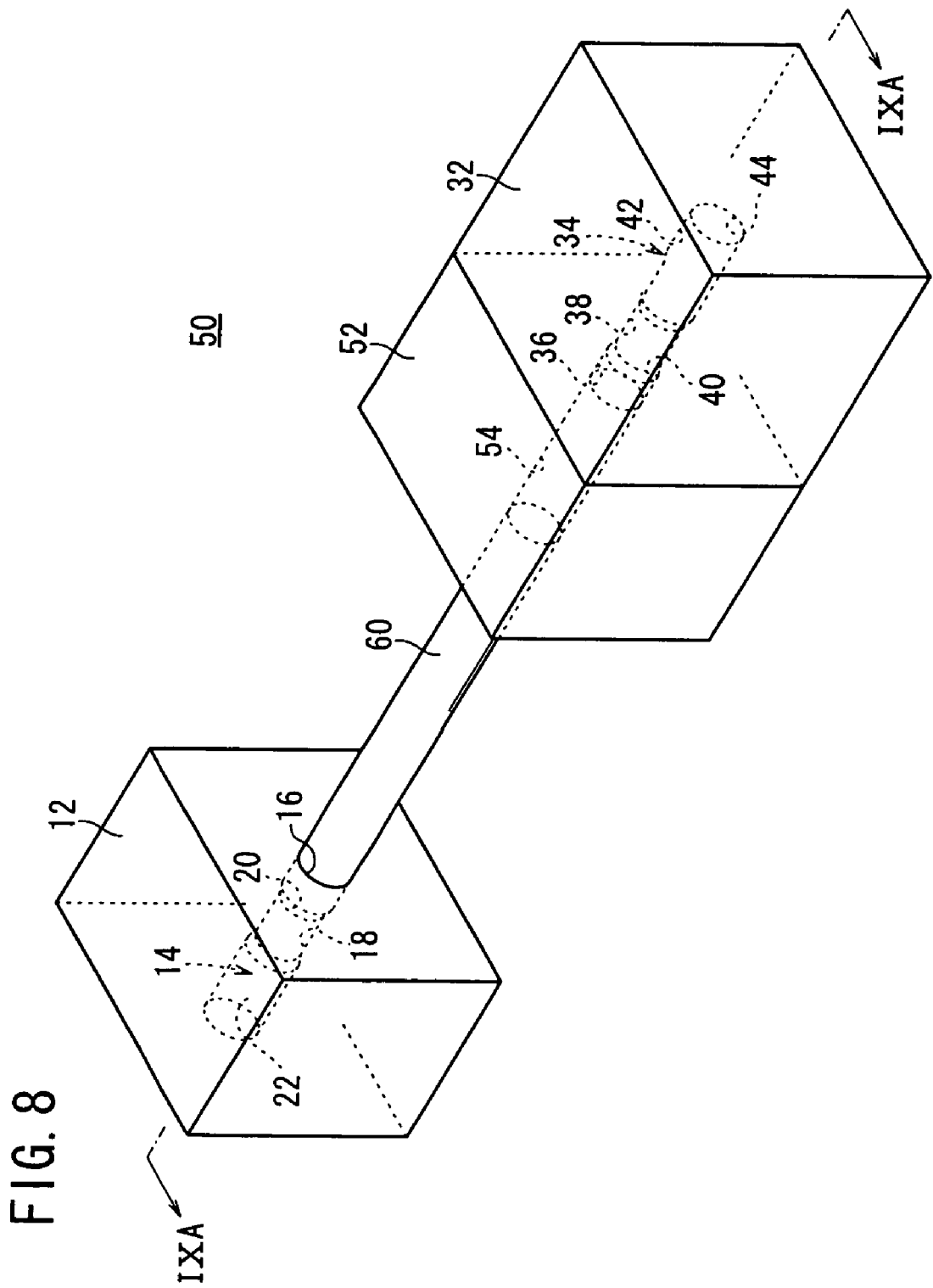
FIG. 8 is a perspective view of the shaft manufacturing apparatus according to the second embodiment, with the second drawing die being fixed in position.

The cylindrical solid rod 60 is inserted through the through hole 54 in the guide die 52, and the second drawing die 32 is fixedly disposed so as to hold the third opening 36 in the second drawing die 32 in positional alignment with the through hole 54 in the guide die 52 (see FIG. 8). Then, with an end of the guide die 52 being held against the second drawing die 32, the end portion 62B of the cylindrical solid rod 60 which is inserted through the through hole 54 is inserted into the third opening 36. The end portion 62A of the cylindrical solid rod 60 is inserted into the first opening 16. Then, as shown in FIG. 9A, the first drawing die 12 is displaced toward the second drawing die 32 in the direction indicated by the arrow Y. Since the angle α of the first tapered part 20 is greater than the angle β of the second tapered part 40 as described above, when the first drawing die 12 is displaced in the direction indicated by the arrow Y, the end portion 62A is not essentially drawn, and the end portion 62B is displaced in the direction indicated by the arrow Y and drawn by the second tapered part 40 and the second forming land 38. The end portion 62B is continuously drawn until it abuts against the closed end 44 of the inner space 42 (see FIG. 9B).

After the end portion 62B has abutted against the closed end 44, the first drawing die 12 is further displaced in the direction indicated by the arrow Y to cause the first tapered part 20 and the first forming land 18 to draw the end portion 62A (see FIG. 9C).

After the end portion 62A has been drawn over a desired range, the first drawing die 12 is displaced away from the second drawing die 32, and removed from the cylindrical solid rod 60. Then, the cylindrical solid rod 60 is removed from the second drawing die 32 and the guide die 52. The cylindrical solid rod 60 thus drawn is now available as the desired shaft 64 with the central portion thereof being greater in diameter than the opposite end portions.

With the shaft manufacturing apparatus 50 according to the second embodiment, the first drawing die 12 or the second drawing die 32 is separate from the guide die 52. However, the guide die 52 may be integrally combined with the first drawing die 12 or the second drawing die 32. In the second embodiment, one guide die 52 is disposed between the first drawing die 12 and the second drawing die 32. However, two or more guide dies 52 may be disposed between the first drawing die 12 and the second drawing die 32.

As described above, the method of and the apparatus for manufacturing the shaft according to the second embodiment employ the guide die 52 disposed between the first drawing die 12 and the second drawing die 32. After the cylindrical solid rod 60 has been inserted through the through hole 54 in the guide die 52, the opposite ends of the cylindrical solid rod 60 are drawn respectively by the first drawing die 12 and the second drawing die 32. Therefore, even if the cylindrical solid rod 60 is considerably long, the cylindrical solid rod 60 is prevented from buckling or being swaged during the drawing process.

With the shaft manufacturing apparatus 10, 50 according to the first and second embodiments, only one of the first drawing die 12 and the second drawing die 32 is displaced. However, the first drawing die 12 and the second drawing die 32 may not be fixed in position, but may be displaced toward each other to draw the opposite end portions of the cylindrical solid rod 60.

Figure 10:
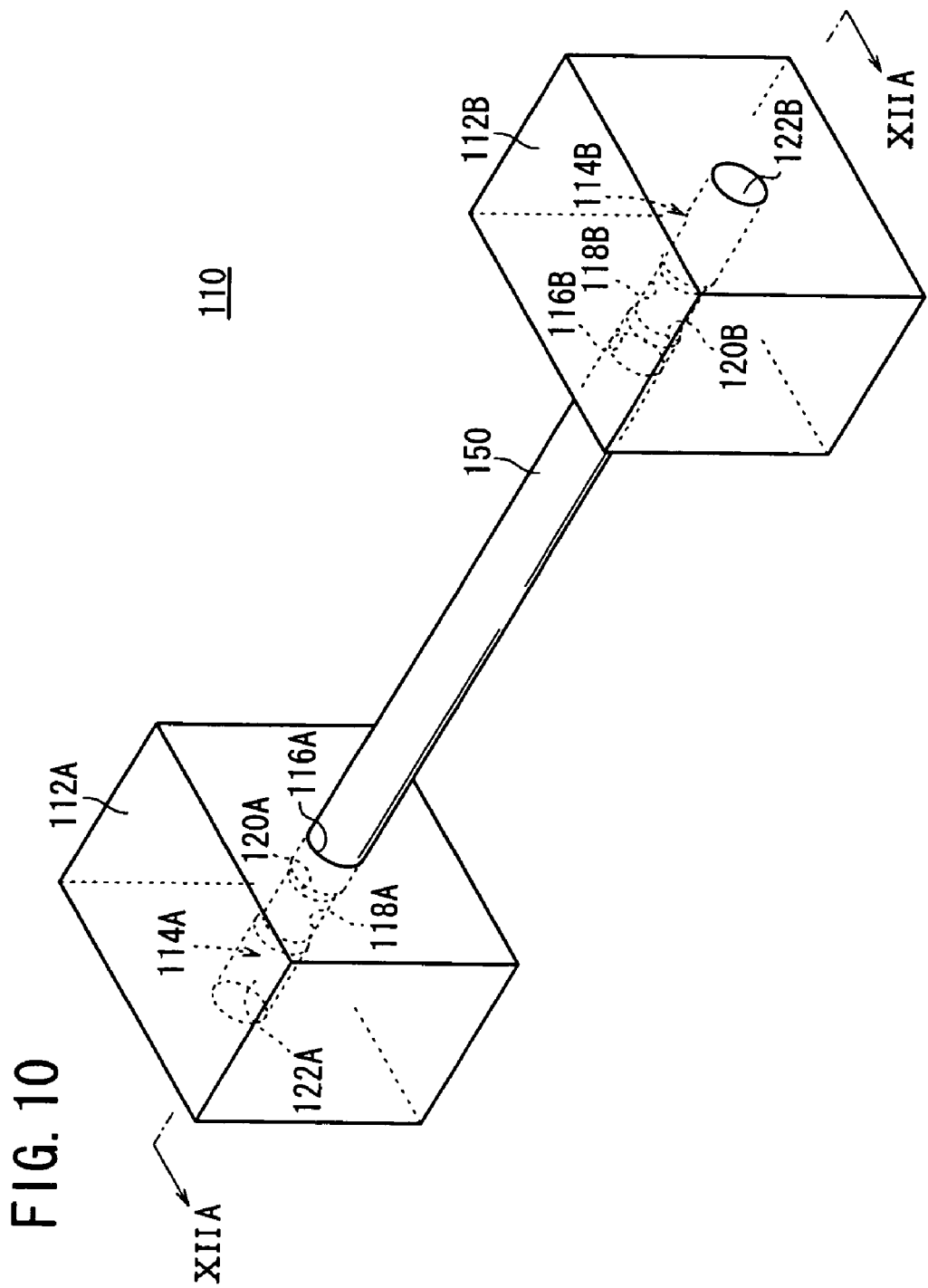
FIG. 10 is a perspective view of a shaft manufacturing apparatus according to a third embodiment of the present invention.

FIG. 10 is a perspective view of a shaft manufacturing apparatus 110 according to a third embodiment of the present invention.

As shown in FIG. 10, the shaft manufacturing apparatus 110 comprises a columnar drawing die 112A (third drawing die) and a columnar drawing die 112B (fourth drawing die). The drawing dies 112A, 112B have respective cylindrical cavities 114A, 114B which are open at both ends thereof. A cylindrical solid rod 150 has an end portion inserted into the cavity 114A through a fourth opening 116A in one of the ends thereof. The cavity 114A is defined by a circumferential wall surface having a forming land 118A for drawing the end portion of the cylindrical solid rod 150, a first tapered part 120A extending from the fourth opening 116A to the forming land 118A, and a fifth opening 122A, for accommodating the end portion of the cylindrical solid rod 150 therein after the end portion of the cylindrical solid rod 150 has been drawn. The diameter of the fourth opening 116A is substantially equal to the diameter of the cylindrical solid rod 150, and is greater than the diameter of the forming land 118A. The tapered part 120A is inclined a predetermined angle α to the axis of the cavity 114A (see FIG. 11). The diameter of the fifth opening 122A is greater than the diameter of the forming land 118A. The drawing dies 112A, 112B are fully symmetrical in structure. Therefore, those parts of the drawing die 112B which are identical to those of the drawing die 112A are denoted by identical reference numerals with a suffix B, and will not be described in detail below. The tapered part 120A is inclined the angle α to the axis of the cavity 114A, and the tapered part 120B is also inclined the angle α to the axis of the cavity 114B.

Figure 12A:
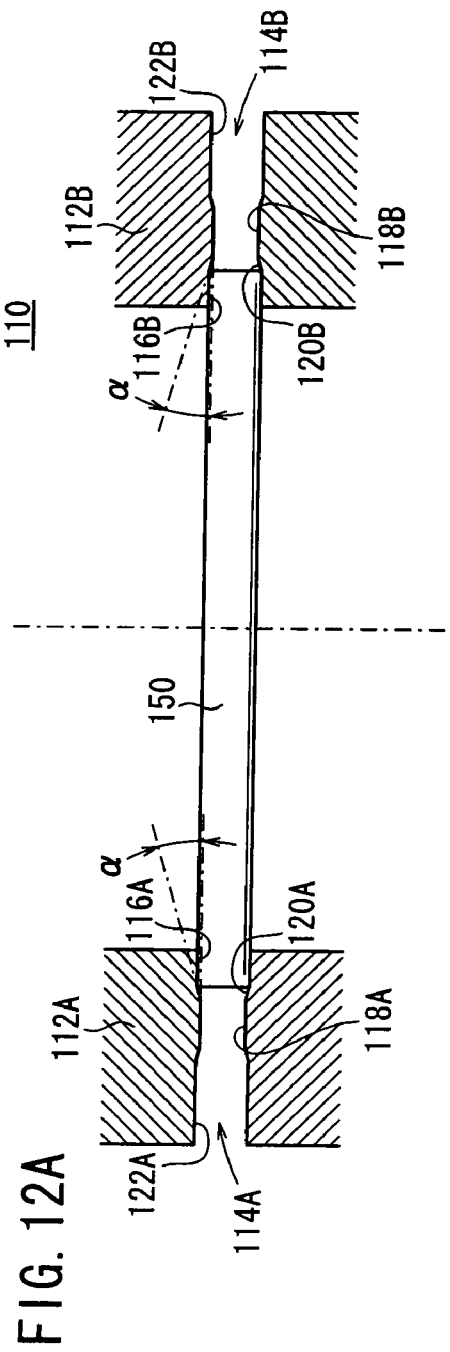
FIGS. 12A and 12B are cross-sectional views taken along line XIIA-XIIA of FIG. 10, showing successive steps of a shaft manufacturing process in which the cylindrical solid rod is inserted in the shaft manufacturing apparatus according to the third embodiment.
Figure 12B:
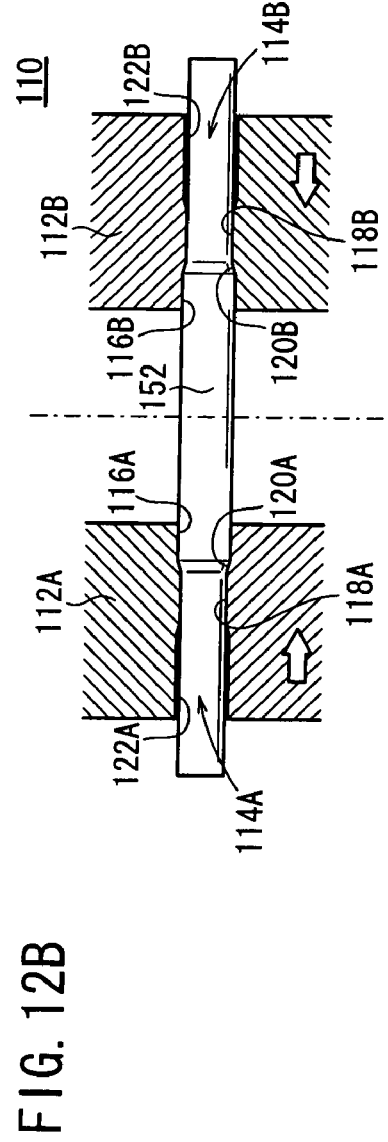
Figure 12C:
FIG. 12C is a side elevational view of a shaft manufactured by the shaft manufacturing apparatus according to the third embodiment.

A method of manufacturing a shaft according to the third embodiment, which is carried out by the shaft manufacturing apparatus 110 according to the third embodiment, will be described below with reference to FIGS. 12A through 12C.

The drawing die 112A and the drawing die 112B are disposed such that their fourth openings 116A, 116B confront each other. The opposite end portions of the cylindrical solid rod 150 are inserted respectively into the fourth openings 116A, 116B. Then, the drawing die 112A and the drawing die 112B are displaced toward each other (see FIG. 12A). After the opposite end portions of the cylindrical solid rod 150 have reached the respective tapered parts 120A, 120B, the drawing die 112A and the drawing die 112B are further displaced toward each other. Since the diameters of the forming lands 118A, 118B and the tapered parts 120A, 120B are smaller than the diameter of the cylindrical solid rod 150, the displacement of the drawing dies 112A, 112B causes the forming lands 118A, 118B and the tapered parts 120A, 120B to draw the opposite end portions of the cylindrical solid rod 150. The drawing dies 112A, 112B are continuously displaced toward each other until the opposite end portions of the cylindrical solid rod 150 are drawn over a desired range (see FIG. 12B).

After the opposite end portions of the cylindrical solid rod 150 have been drawn over the desired range, the drawing dies 112A, 112B are displaced away from each other, and then cylindrical solid rod 150 is removed from the drawing dies 112A, 112B. The cylindrical solid rod 150 thus drawn is now available as a desired shaft 152 (see FIG. 12C) with a central portion thereof being greater in diameter than opposite end portions thereof.

With the above method of manufacturing a shaft, both the drawing dies 112A, 112B are displaced toward each other. However, either one of the drawing dies 112A, 112B, e.g., the drawing die 112A, may be fixed in position, and the drawing die 112B may be movable. Then, the opposite end portions of the cylindrical solid rod 150 may be inserted respectively into the fourth openings 116A, 116B (see FIG. 13A), and only the drawing die 112B may be moved to draw the opposite end portions of the cylindrical solid rod 150 in the drawing dies 112A, 112B (see FIG. 13B). As the angles α of the tapered parts 120A, 120B with respect to the axes of the cavities 114A, 114B are equal to each other, the drawing dies 112A, 112B can produce the desired drawn shaft 152 (see FIG. 12C).

When both the drawing dies 112A, 112B are displaced to draw the cylindrical solid rod 150, the load applied to the tapered parts 120A, 120B is one-half the load applied to the tapered parts 120A, 120B when the drawing die 112A is fixed in position and the drawing die 112B is displaced.

The method of and the apparatus for manufacturing the shaft according to the third embodiment employ the drawing die 112A (third drawing die) with the cylindrical cavity 114A defined therein which is open at both ends thereof and the drawing die 112B (fourth drawing die) with the cylindrical cavity 114B defined therein which is open at both ends thereof. The diameters of the fourth openings 116A, 116B and the fifth openings 122A, 122B of the cavities 114A, 114B are greater than the diameters of the forming lands 118A, 118B. The tapered parts 120A, 120B extend from the fourth openings 116A, 116B to the forming lands 118A, 118B, and the angle formed between the tapered part 120A of the drawing die 112A and the axis of the cavity 114A is equal to the angle formed between the tapered part 120B of the drawing die 112B and the axis of the cavity 114B. The shaft manufacturing apparatus 110 thus constructed operates to draw the cylindrical solid rod 150 as follows: The opposite end portions of the cylindrical solid rod 150 are inserted respectively into the fourth openings 116A, 116B, and at least one of the drawing dies 112A, 112B is displaced in a direction to move the fourth openings 116A, 116B toward each other. The opposite end portions of the cylindrical solid rod 150 which are inserted respectively in the fourth openings 116A, 116B are now drawn by the tapered parts 120A, 120B and the forming lands 118A, 118B, whereupon the desired shaft is produced. Either one of the drawing dies 112A, 112B may be fixed in position, and only the other drawing die may be displaced to draw the opposite end portions of the cylindrical solid rod 150.

With the method of and the apparatus for manufacturing the shaft according to the third embodiment, since the opposite end portions of the cylindrical solid rod 150 are simultaneously drawn, the number of machining steps for manufacturing the shaft is reduced and the manufacturing time is shortened.

Figure 14:
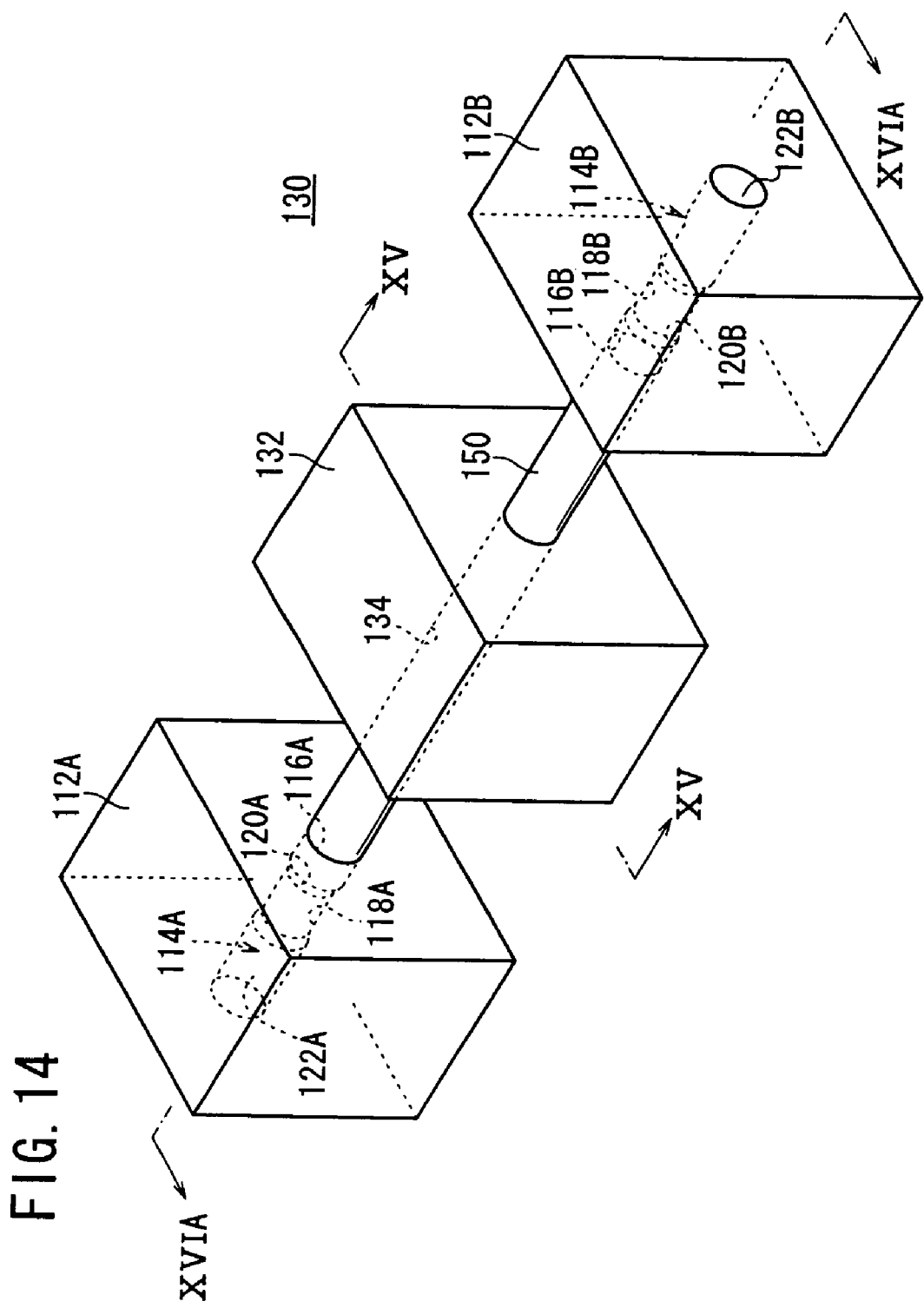
FIG. 14 is a perspective view of a shaft manufacturing apparatus according to a fourth embodiment of the present invention.

FIG. 14 is a perspective view of a shaft manufacturing apparatus 130 according to a fourth embodiment of the present invention. Those parts shown in FIG. 14 which are identical to those of the shaft manufacturing apparatus 110 according to the third embodiment are denoted by identical reference characters, and will not be described in detail below. The shaft manufacturing apparatus 130 is similar to the shaft manufacturing apparatus 110 according to the third embodiment except that it additionally includes a columnar guide die 132 interposed between the drawing dies 112A, 112B.

Figure 15:
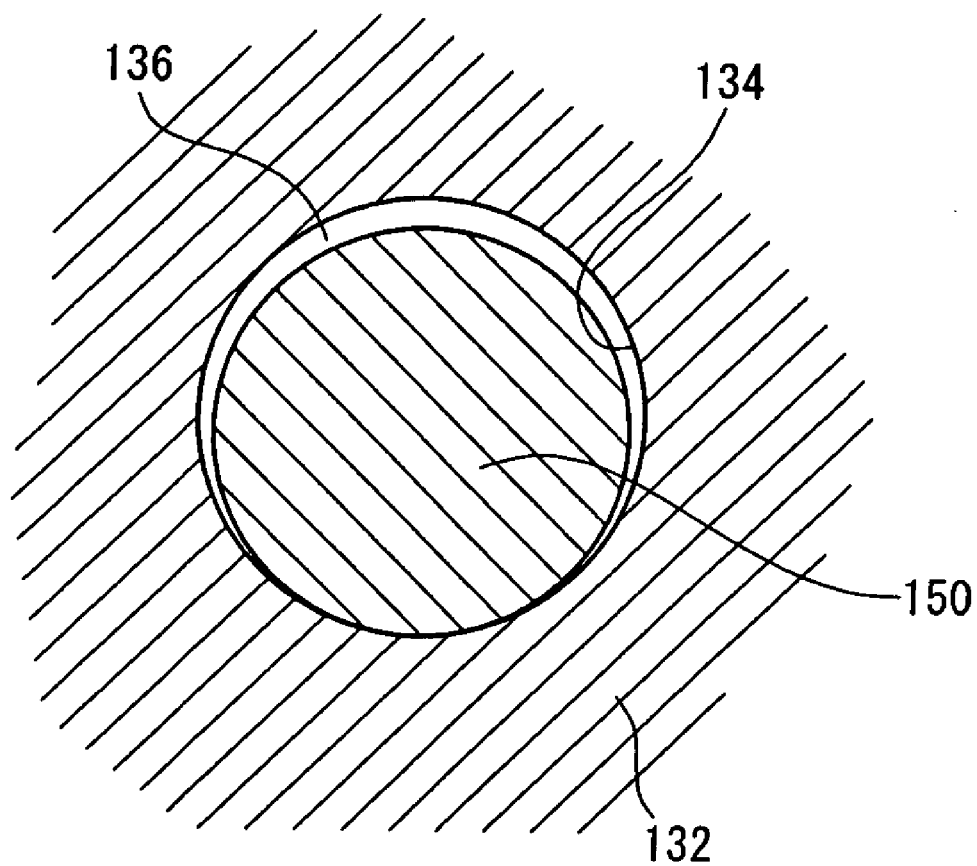
FIG. 15 is a cross-sectional view taken along line XV-XV of FIG. 14.
Figures 17A, 17B:
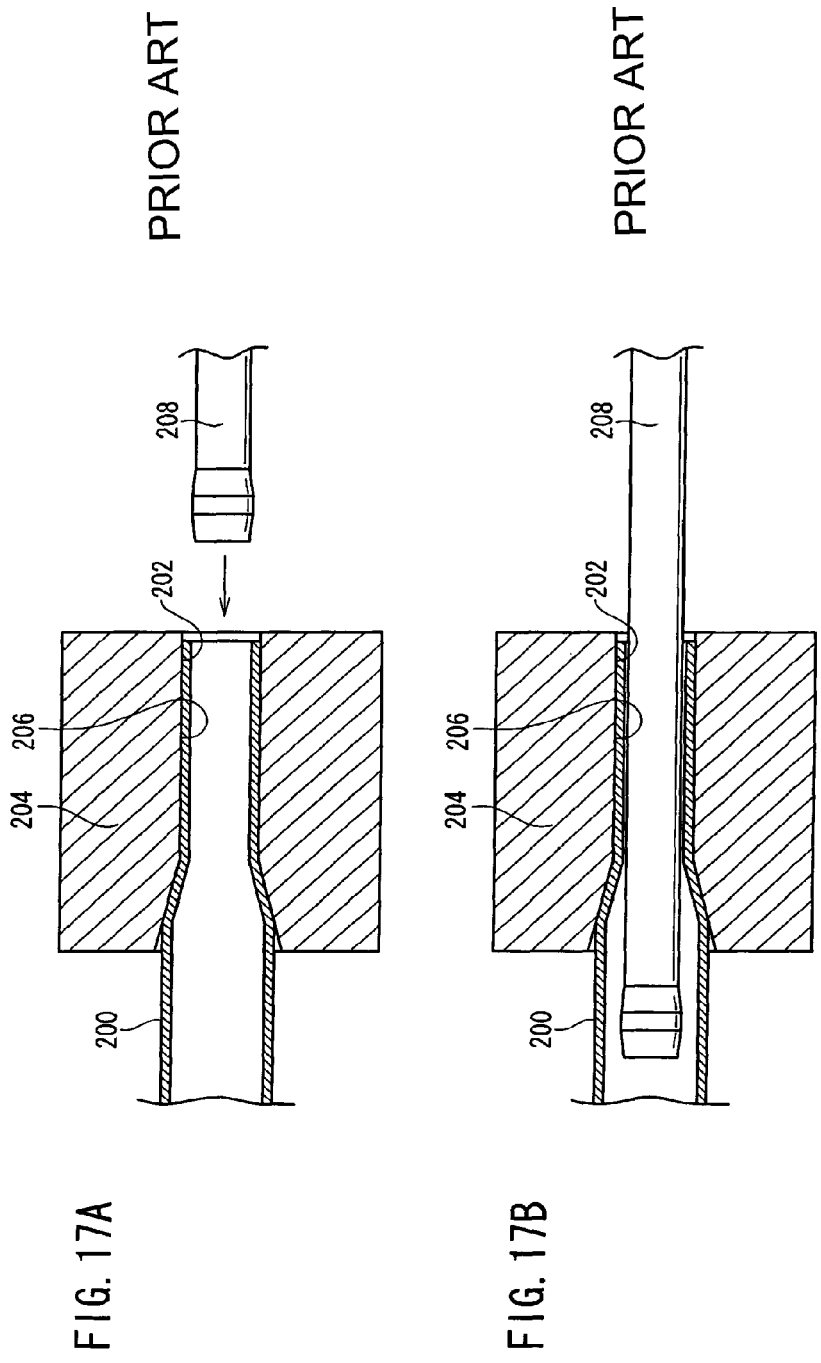
FIGS. 17A and 17B are cross-sectional views showing successive steps of a conventional shaft manufacturing process.

The columnar guide die 132 has a through hole 134 defined therein for inserting the cylindrical solid rod 150 therein and guiding the cylindrical solid rod 150 therethrough. As shown in FIG. 15, the diameter of the through hole 134 is greater than the diameter of the cylindrical solid rod 150, providing a given clearance 136 between the cylindrical solid rod 150 and the inner surface defining the through hole 134 when the cylindrical solid rod 150 is inserted in the through hole 134. The clearance 136 allows the cylindrical solid rod 150 to be easily inserted into the through hole 134.

A method of manufacturing a shaft according to the fourth embodiment, which is carried out by the shaft manufacturing apparatus 130 according to the fourth embodiment, will be described below with reference to FIGS. 16A and 16B.

The cylindrical solid rod 150 is inserted through the through hole 134 in the guide die 132, and the drawing dies 112A, 112B are disposed such that the fourth openings 116A, 116B confront each other. The opposite end portions of the cylindrical solid rod 150 are inserted respectively into the fourth openings 116A, 116B (see FIG. 16A). Then, the drawing dies 112A, 112B are displaced toward each other until the opposite end portions of the cylindrical solid rod 150 are drawn over a desired range (see FIG. 16B).

After the opposite end portions of the cylindrical solid rod 150 have been drawn over the desired range, the drawing dies 112A, 112B are displaced away from each other, and then cylindrical solid rod 150 is removed from the drawing dies 112A, 112B. The cylindrical solid rod 150 is also removed from the guide die 132. In this manner, the desired shaft 152 is produced.

With the above method of manufacturing a shaft, both the drawing dies 112A, 112B are displaced toward each other. However, either one of the drawing dies 112A, 112B, e.g., the drawing die 112A, may be fixed in position, and the drawing die 112B may be movable. Then, the drawing die 112A and the guide die 132 may be disposed to hold the fourth opening 116A and the through hole 134 in positional alignment with each other, and an end of the guide die 132 may be held against the drawing die 112A. An end portion of the cylindrical solid rod 150 which is inserted through the through hole 134 may be inserted into the fourth opening 116A in the drawing die 112A. Then, the drawing die 112B may be displaced toward the drawing die 112A until the opposite end portions of the cylindrical solid rod 150 may be drawn over a desired range. In this manner, the opposite end portions of the cylindrical solid rod 150 may be drawn.

With the shaft manufacturing apparatus 130 according to the fourth embodiment, the drawing dies 112A, 112B and the guide die 132 are separate from each other. However, the guide die 132 may be integrally combined with the drawing die 112A or the drawing die 112B. In the fourth embodiment, one guide die 132 is disposed between the drawing dies 112A, 112B. However, two or more guide dies 132 may be disposed between the drawing dies 112A, 112B.

As described above, the method of and the apparatus for manufacturing the shaft according to the fourth embodiment employ the guide die 132 disposed between the drawing dies 112A, 112B. After the cylindrical solid rod 150 has been inserted through the through hole 134 in the guide die 132, the opposite ends of the cylindrical solid rod 150 are drawn respectively by the drawing dies 112A, 112B. Therefore, even if the cylindrical solid rod 150 is considerably long, the cylindrical solid rod 150 is prevented from buckling or being swaged during the drawing process.

Although certain preferred embodiments of the present invention have been shown and described in detail, it should be understood that various changes and modifications may be made therein without departing from the scope of the appended claims.

What is claimed is:

1. A method of manufacturing a shaft with a first drawing die having a cylindrical first cavity defined therein which is open at both ends thereof and a second drawing die having a cylindrical second cavity defined therein which is open at one end thereof, wherein said first cavity has first and second openings and a first forming land disposed in said first cavity, diameters of said first and second openings being greater than a diameter of said first forming land, and said second cavity has a third opening, an inner space, and a second forming land disposed in said second cavity, diameters of said third opening and said inner space being greater than a diameter of said second forming land, said first cavity further including a first tapered part extending from said first opening to said first forming land, said second cavity further including a second tapered part extending from said third opening to said second forming land, and wherein an angle formed between said first tapered part and an axis of said first cavity is greater than an angle formed between said second tapered part and an axis of said second cavity, said method comprising the steps of:
  (a) inserting opposite end portions of a cylindrical solid rod respectively into said first opening and said third opening;
  (b) displacing at least one of said first drawing die and said second drawing die in a direction to cause said first opening and third opening to move toward each other, until the end portion of said cylindrical solid rod which is inserted in said third opening reaches a closed end of said inner space of said second cavity, thereby causing said second tapered part and said second forming land to draw said end portion of said cylindrical solid rod; and
  (c) displacing at least one of said first drawing die and said second drawing die in the direction to cause said first opening and third opening to move toward each other, thereby causing said first tapered part and said first forming land to draw the other end portion of said cylindrical solid rod.

2. A method according to claim 1, wherein said step (a) includes the step of:
  inserting said cylindrical solid rod through a through hole defined in a guide die which is disposed between said first drawing die and said second drawing die.

3. An apparatus for manufacturing a shaft, comprising:
  a first drawing die having a cylindrical first cavity defined therein which is open at both ends thereof; and
  a second drawing die having a cylindrical second cavity defined therein which is open at one end thereof;
  wherein said first cavity has first and second openings and a first forming land disposed in said first cavity, the diameters of said first and second openings being greater than the diameter of said first forming land;
  said second cavity has a third opening, an inner space, and a second forming land disposed in said second cavity, diameters of said third opening and said inner space being greater than a diameter of said second forming land;
  said first cavity further including a first tapered part extending from said first opening to said first forming land, said second cavity further including a second tapered part extending from said third opening to said second forming land;
  wherein an angle formed between said first tapered part and an axis of said first cavity is greater than an angle formed between said second tapered part and an axis of said second cavity; and
  wherein after opposite end portions of a cylindrical solid rod have been inserted respectively into said first opening and said third opening, at least one of said first drawing die and said second drawing die is displaced in a direction to cause said first opening and third opening to move toward each other, until the end portion of said cylindrical solid rod which is inserted in said third opening reaches a closed end of said inner space of said second cavity, thereby causing said second tapered part and said second forming land to draw said end portion of said cylindrical solid rod, and thereafter at least one of said first drawing die and said second drawing die is displaced in the direction to cause said first opening and third opening to move toward each other, thereby causing said first tapered part and said first forming land to draw the other end portion of said cylindrical solid rod.

4. An apparatus according to claim 3, wherein either one of said first drawing die and said second drawing die is fixed in position.

5. An apparatus according to claim 3, further comprising:
  a guide die disposed between said first drawing die and said second drawing die, said guide die having a through hole defined therein for inserting said cylindrical solid rod therethrough.

6. An apparatus according to claim 4, further comprising:
  a guide die disposed between said first drawing die and said second drawing die, said guide die having a through hole defined therein for inserting said cylindrical solid rod therethrough.

7. A method of manufacturing a shaft with a first drawing die and a second drawing die each having a cylindrical cavity defined therein which is open at both ends thereof, wherein the cylindrical cavity in each of said first drawing die and said second drawing die has a first opening, a second opening, and a forming land disposed in said cavity, diameters of the first opening and the second opening being greater than a diameter of said forming land, the cylindrical cavity in each of said first drawing die and said second drawing die further including a tapered part extending from said first opening to said forming land, and wherein an angle formed between the tapered part of the cylindrical cavity in said first drawing die and an axis of said cylindrical cavity in said first drawing die is equal to an angle formed between the tapered part of the cylindrical cavity in said second drawing die and an axis of said cylindrical cavity in said second drawing die, said method comprising the steps of:
  (a) inserting opposite end portions of a cylindrical solid rod respectively into said first and second openings, wherein said step (a) includes the step of:
    inserting said cylindrical solid rod through a through hole defined in a guide die which is disposed between said first drawing die and said second drawing die; and
  (b) displacing at least one of said first drawing die and said second drawing die in a direction to cause said first and second openings to move toward each other, thereby causing said tapered parts and said forming lands to draw said end portions of said cylindrical solid rod which are inserted respectively in said first and second openings.

8. An apparatus for manufacturing a shaft, comprising:
  a first drawing die and a second drawing die each having a cylindrical cavity defined therein which is open at both ends thereof,
    wherein the cylindrical cavity in each of said first drawing die and said second drawing die has a first opening, a second opening, and a forming land disposed in said cavity,
    diameters of the first opening and the second opening being greater than a diameter of said forming land,
    the cylindrical cavity in each of said first drawing die and said second drawing die further including a tapered part extending from said first opening to said forming land, wherein an angle formed between the tapered part of the cylindrical cavity in said first drawing die and an axis of said cylindrical cavity in said first drawing die is equal to an angle formed between the tapered part of the cylindrical cavity in said second drawing die and an axis of said cylindrical cavity in said second drawing die, and wherein after opposite end portions of a cylindrical solid rod have been inserted respectively into said first and second openings, at least one of said first drawing die and said second drawing die is displaced in a direction to cause said first and second openings to move toward each other, thereby causing said tapered parts and said forming lands to draw said end portions of said cylindrical solid rod; and a guide die disposed between said first drawing die and said second drawing die, said guide die having a through hole defined therein for inserting said cylindrical solid rod therethrough.

9. An apparatus according to claim 8, wherein either one of said first drawing die and said second drawing die is fixed in position.

* * * * *